US008531704B2

(12) United States Patent  (10) Patent No.: US 8,531,704 B2
Maruyama et al.  (45) Date of Patent: Sep. 10, 2013

(54) IMAGE COMMUNICATION APPARATUS STORING AND DISPLAYING TRANSMISSION DESTINATION ADDRESS INFORMATION ACCORDING TO A PRIORITY ESTABLISHED BY A CURRENT USE OR A POST FREQUENCY OF USE OF EACH DESTINATION ADDRESS INFORMATION AND AN IMAGE FORMING APPARATUS INCLUDING THE SAME

(75) Inventors: Miyoko Maruyama, Osaka (JP); Terumi Hayashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 558 days.

(21) Appl. No.: 12/805,468

(22) Filed: Aug. 2, 2010

(65) Prior Publication Data

US 2011/0026075 A1 Feb. 3, 2011

(30) Foreign Application Priority Data

Aug. 3, 2009 (JP) ................................. 2009-180623

(51) Int. Cl.
*G06F 3/12* (2006.01)
(52) U.S. Cl.
USPC ......... 358/1.15; 358/1.14; 715/794; 715/807; 399/81
(58) Field of Classification Search
USPC .......... 358/1.14, 1.15; 715/794, 807; 399/81
See application file for complete search history.

(56) References Cited

U.S. PATENT DOCUMENTS

| 6,459,504 B1 | 10/2002 | Murano et al. |
| 7,913,168 B2 | 3/2011 | Hoshino et al. |
| 2004/0070627 A1* | 4/2004 | Shahine et al. ............... 345/794 |
| 2005/0162399 A1 | 7/2005 | Yamada |
| 2005/0281577 A1* | 12/2005 | Tamura et al. .................. 399/81 |
| 2006/0209690 A1* | 9/2006 | Brooke .......................... 370/230 |
| 2008/0084580 A1* | 4/2008 | Tamura et al. ............... 358/1.15 |
| 2008/0199199 A1* | 8/2008 | Kato et al. ....................... 399/81 |
| 2008/0294983 A1 | 11/2008 | Hoshino et al. |
| 2009/0199109 A1* | 8/2009 | Doui .............................. 715/750 |
| 2010/0290068 A1 | 11/2010 | Okada et al. |
| 2010/0290071 A1 | 11/2010 | Okada et al. |
| 2010/0290085 A1 | 11/2010 | Okada et al. |
| 2010/0313163 A1 | 12/2010 | Yamada et al. |
| 2011/0007351 A1 | 1/2011 | Kurumasa et al. |

FOREIGN PATENT DOCUMENTS

| JP | 3-189853 A | 8/1991 |
| JP | 3-192961 A | 8/1991 |
| JP | 5-048704 A | 2/1993 |
| JP | 7-013732 A | 1/1995 |
| JP | 7-177215 A | 7/1995 |

(Continued)

*Primary Examiner* — Jacky X Zheng
(74) *Attorney, Agent, or Firm* — Edwards Wildman Palmer LLP; David G. Conlin; David A. Tucker

(57) ABSTRACT

An image communication apparatus includes: a storage device storing an address identifier and frequency of use of an address as a transmission destination; an address display device displaying a plurality of addresses such that an address of high frequency of use is displayed with higher priority than an address of low frequency of use; a designating device allowing a user to designate a transmission destination from a plurality of displayed addresses; an image data transmitting device transmitting image data to a designated transmission destination; and a display changing device for changing, if an address having low frequency of use and displayed without priority among the addresses stored in the storage device is designated as a transmission destination, the manner of display to have the address displayed with priority.

13 Claims, 28 Drawing Sheets

(56) References Cited

FOREIGN PATENT DOCUMENTS

| JP | 8-242278 A | 9/1996 |
|---|---|---|
| JP | 2000-134313 A | 5/2000 |
| JP | 2002-162869 A | 6/2002 |
| JP | 2005-102001 A | 4/2005 |
| JP | 2005-136468 A | 5/2005 |
| JP | 2006-323718 A | 11/2006 |
| JP | 2007-136756 A | 6/2007 |
| JP | 2008-217417 A | 9/2008 |
| JP | 2009-093224 A | 4/2009 |
| JP | 2009-130815 A | 6/2009 |

* cited by examiner

FIG. 4

| REGISTRATION No. | DISPLAY NAME | FAX No. | MAIL ADDRESS | PUBLICATION FLAG | SAVE/NON-SAVE FLAG | OWNER ID (PERSONAL ADDRESS BOOK OWNER ID) | ... |
|---|---|---|---|---|---|---|---|
| 001 | | | | | | | |
| 002 | | | | | | | |
| 003 | | | | | | | |
| 004 | | | | | | | |
| 005 | | | | | | | |
| 006 | | | | | | | |
| 007 | | | | | | | |
| 008 | | | | | | | |
| 009 | | | | | | | |
| 010 | | | | | | | |
| 011 | | | | | | | |
| ... | | | | | | | |

FIG. 5

| REGISTRATION No. | PRESENT STATE | DATE OF MOVEMENT TO SAVE FOLDER | MONTH (SEASON) USED FREQUENTLY BEFORE SAVE/NON-SAVE DETERMINATION | DATE & TIME OF USE (1) | USED USER ID (1) | DATE & TIME OF USE (10) | USED USER ID (10) |
|---|---|---|---|---|---|---|---|
| 001 | NORMAL | | | | | | |
| 002 | NORMAL | | | | | | |
| 003 | NORMAL | | | | | | |
| 004 | NORMAL | | | | | | |
| 005 | SAVED | 20090731 | | | | | |
| 006 | NORMAL | | | | | | |
| 007 | NORMAL | | | | | | |
| 008 | NORMAL | | | | | | |
| 009 | NORMAL | | | | | | |
| 010 | NORMAL | | | | | | |
| 011 | NORMAL | | | | | | |
| ... | ... | | | | | | |

IMAGE COMMUNICATION APPARATUS STORING AND DISPLAYING TRANSMISSION DESTINATION ADDRESS INFORMATION ACCORDING TO A PRIORITY ESTABLISHED BY A CURRENT USE OR A POST FREQUENCY OF USE OF EACH DESTINATION ADDRESS INFORMATION AND AN IMAGE FORMING APPARATUS INCLUDING THE SAME

CROSS-REFERENCE TO RELATED APPLICATION

This nonprovisional application claims priority under 35 U.S.C. §119(a) on Patent Application No. 2009-180623 filed in Japan on Aug. 3, 2009, the entire contents of which are hereby incorporated by reference.

BACKGROUND OF THE INVENTION

1. Field of the Invention

The present invention relates to an image communication apparatus represented by a facsimile apparatus, in which facsimile numbers and/or mail addresses of transmission destinations are registered in an address book in advance, and a destination is designated using the address book at the time of transmission. More specifically, the present invention relates to an image communication apparatus capable of appropriately managing an address book, no matter whether it is a shared address book or a personal address book (personal address book of each logged-in user).

2. Description of the Background Art

It has become increasingly common to connect an image forming apparatus having a printer function or a copy function to a network, to allow use by a plurality of users. Further, the number of apparatuses having a plurality of modes such as a copy mode, an image communication mode (typically a facsimile mode (hereinafter "facsimile" may also be denoted as FAX or fax)), a network-supported printer mode and a scanner mode, such as MFPs (multi-function peripherals), is increasing. The image communication mode includes the facsimile communication mode of transmitting/receiving image data using public line, an Internet facsimile communication mode of transmitting/receiving image data using Internet connection, an electronic mail communication mode of transmitting/receiving image data as an attachment to an electronic mail (scan-to-mail), an image transfer mode of transferring image data to a storage inside of the MFP, and an image transfer mode (scan-to-folder) of transferring image data to a specific folder using a network line.

In such an MFP, in order to simplify user's operation and to prevent misdirection, it is a common practice to register a destination name (display name) and a FAX number and/or mail address as a speed dial or an abbreviated dial, and to designate a destination using the speed dial or the abbreviated dial at the time of transmission.

Recent MFPs come to have larger storage capacity and allows registration of a huge number of destinations in an address book. It is often the case that such an MFP is shared by a number of users, and when shared, the address book is often shared (when an MFP is shared, it is also common to use a personal address for each logged-in user). No matter whether one address book is shared in an MFP used by a number of users or personal address books are used in a shared MFP, if the number of addresses registered in the address book increases, it becomes necessary to search for a desired address from a large number of addresses. Hence, it becomes difficult to designate a destination. In such a case, it is necessary for an administrator for a shared address book and for the user of each personal address book to maintain the address book and to delete addresses not used (not designated as destinations) for a long time.

Though not directly related to such maintenance of address books, Japanese Patent Laying-Open No. 7-13732 (hereinafter referred to as "'732 Reference") discloses a method of display letting the user know that an icon indicating a program or indicating a combination of a program and data has not been used for a long time, in an information processing system such as a personal computer. According to the icon display method disclosed in '732 Reference, icons are displayed on a display screen. When a user selectively designates a displayed icon, information corresponding to the icon is designated. According to the display method, elapsed time after the last designation of an icon is measured. If the counted time exceeds a first specific time, the manner of display of the icon is changed, to give an alarm. Further, if the measured time exceeds a second specific time longer than a first specific time, the alarm-displayed icon is erased from the display screen.

According to the icon display method, the user can grasp information (icon) not used for a prescribed elapse time. Further, since display of an icon that is not used can be erased from the display screen, the display screen can be used efficiently.

The icon display method disclosed in '732 Reference, however, has the following problem. Specifically, the icon that is not used is eventually not displayed on the display screen. If the user wishes to use the icon again, it is necessary to form the icon again. In other words, simply by deleting information (icon) that is not used for a prescribed time period from the display screen, it is impossible to appropriately meet the demand of the user to use the icon again.

Even when such a method of icon display is applied to maintenance of an address book, what is attained is only an erasure of an address that has not been used for a long time. After an icon is erased, it becomes impossible to designate it as a destination, and it becomes necessary to register it again or to directly input a facsimile number or a mail address. Thus, it is impossible in the image transmission process to simplify user's operation or to prevent misdirection.

SUMMARY OF THE INVENTION

Therefore, it is desirable to provide an image communication apparatus in which facsimile numbers and/or mail addresses are registered in an address book in advance and when a transmission destination is to be designated by speed dial or abbreviated dial, designation of a transmission destination is made easier using the address book, as well as to provide an image forming apparatus including such a communication apparatus. It is also desirable to have the address book maintained appropriately reflecting the use history of each user.

According to an aspect, the present invention provides an image communication apparatus having a plurality of destinations registered in advance, and transmitting image data to an address designated from said plurality of destinations as a transmission destination. The image communication apparatus includes: a storage device storing destination information used by the image communication apparatus to identify the destination, and frequency of use of the destination as a transmission destination; a destination display device displaying the plurality of destinations registered in advance in the storage device, giving higher priority to a destination having high frequency of use than a destination having low frequency; a designating device connected to the destination display device, allowing a user to designate a transmission destination from a plurality of destinations displayed by the destination display device; an image data transmitting device, connected to the designating device, for transmitting image data to a transmission destination designated by the designating device; and a display changing device connected to the storage device and the destination display device, for changing, if an address stored in the storage device and having low frequency of use and displayed without priority is designated as a transmission destination, a manner of display by the display device to display the address with priority.

In the image communication apparatus, at least one destination is designated as a transmission destination from among a plurality of destinations (address book) stored in advance as candidate of transmission destinations (in case of multicast transmission, a plurality of transmission destinations are designated). Here, the plurality of destinations are displayed with frequently used ones given higher priority to less frequently used ones. Therefore, it is easier to designate a destination that is frequently used. Even a destination that is not frequently used and displayed with low priority may be designated as a transmission destination. In such a case, the manner of display of low priority corresponding to the low frequency is changed to a manner of display with high priority. Therefore, once a destination that has been displayed with low priority as it is not used frequently is designated as a transmission destination, the destination comes to be displayed with high priority. Since a destination designated as a transmission destination is always displayed with priority, it is easy to designate a destination. In addition, even a destination not frequently used can be designated as a transmission destination, and once designated as a transmission destination, it can be displayed with high priority. As a result, when facsimile numbers and/or mail addresses are registered in advance and a transmission destination is to be designated using speed dial or abbreviated dial, the address book storing a plurality of destinations is maintained appropriately reflecting the use history of the user, and hence, an image communication apparatus allowing the user to easily designate a transmission destination can be provided.

Preferably, the storage device includes a first area for storing information related to a destination having the high frequency and a second area for storing information related to a destination having the low frequency. The destination display device includes a hierarchical display device displaying the plurality of destinations registered in advance in the storage device in a hierarchical manner, with a destination stored in the first area displayed on an upper layer than a destination stored in the second area. The display changing device includes an area changing device for changing, if a destination stored in the second area and displayed on a lower layer is designated as a transmission destination, the destination to be stored in the first area.

Information of a destination that is frequently designated as a transmission destination is stored in a first area, and information of a destination that is not frequently designated as a transmission destination is stored in a second area. The destination stored in the first area is displayed on a layer upper than the destination stored in the second area. The destination stored in the first area, which is more frequently designated as a transmission destination, can be displayed with priority on a higher layer.

The display changing device may include a display manner changing device for changing the manner of display based on restore conditions, if a destination of low frequency is designated as a transmission destination. Here, the restore conditions may be related to how many times a destination is designated as a transmission destination. The restore conditions may be related to how many times a logged-in user designated the destination as the transmission destination. The restore conditions may be related to the user who designated the destination as a transmission destination.

The restore condition related to how many times a destination of low frequency is designated as a transmission destination, and the restore condition related to the user who designated the destination as the transmission destination are set. If a destination is designated a desired number of times as the transmission destination or if it is designated by a specific user as the transmission destination, the manner of display is automatically changed so that the destination is displayed with priority. Therefore, maintenance by the user is unnecessary.

According to another aspect, the image forming apparatus in accordance with the present invention includes any of the above-described image communication apparatuses.

When a transmission destination for transmitting an image is designated from a plurality of destinations in the image communication apparatus included in the image forming apparatus, the plurality of destinations are displayed with frequently used ones given higher priority to less frequently used ones. Therefore, it is easier to designate a destination that is frequently used. If a destination that is not frequently used and displayed with low priority is designated as a transmission destination, the manner of display of low priority corresponding to the low frequency is changed to a manner of display with high priority. Therefore, once a destination that has been displayed with low priority as it is not used frequently is designated as a transmission destination, the destination comes to be displayed with high priority. Since a destination designated as a transmission destination is always displayed with priority, it is easy to designate a destination. In addition, even a destination not frequently used can be designated as a transmission destination, and once designated as a transmission destination, it can be displayed with high priority.

In the image communication apparatus and the image forming apparatus including the same in accordance with the present invention, when facsimile numbers and/or mail addresses are registered in advance and a transmission destination is to be designated using speed dial or abbreviated dial, the address book storing a plurality of destinations is maintained appropriately reflecting the use history of the user, and hence, it becomes easier for the user to designate a transmission destination.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows an address registration table stored in image forming apparatus 150 shown in FIG. 1.

FIG. 5 shows an address use management table stored in image forming apparatus 150 shown in FIG. 1.

DESCRIPTION OF THE PREFERRED EMBODIMENTS

Figure 1:
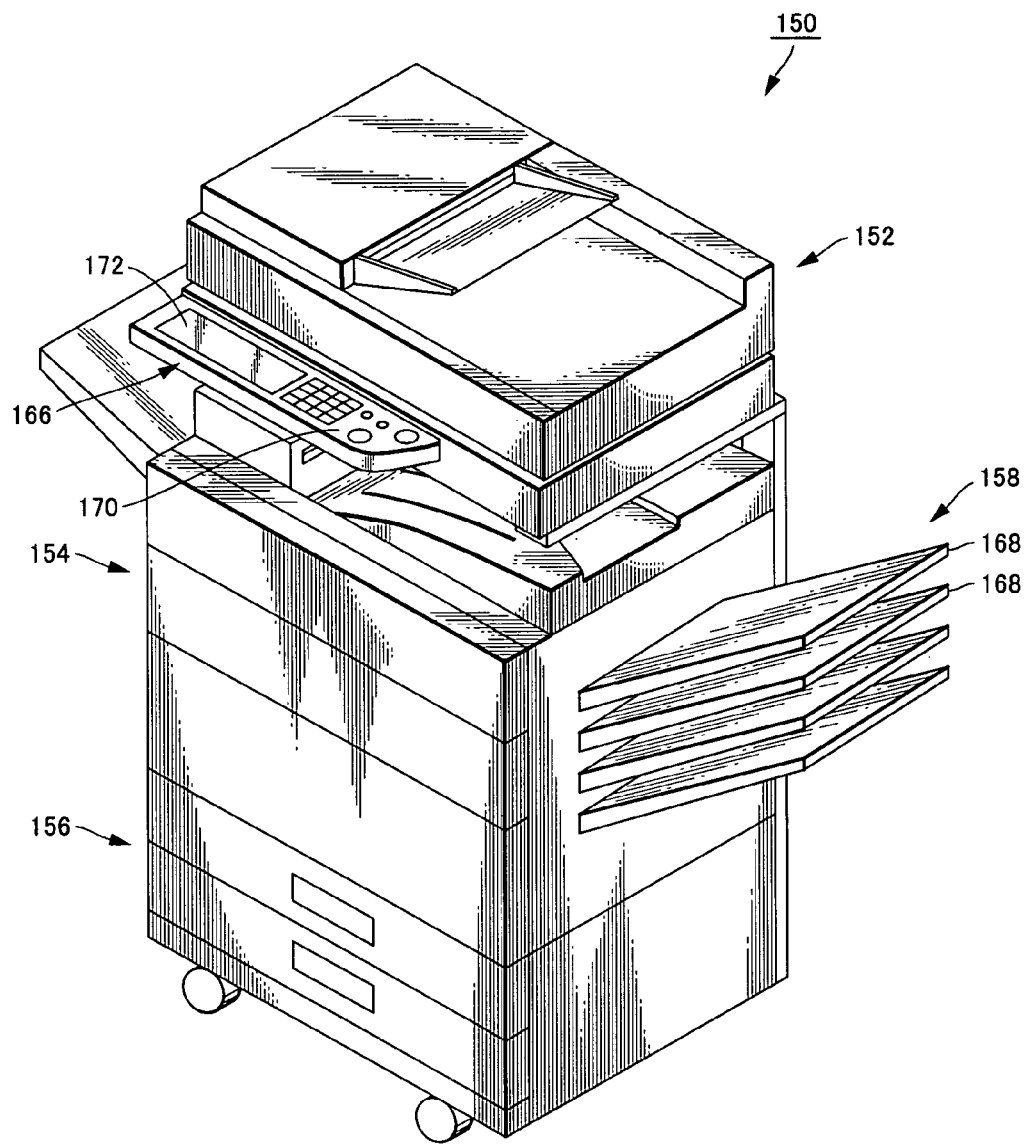
FIG. 1 is a perspective view showing an appearance of an image forming apparatus 150 in accordance with a first embodiment of the present invention.

In the following description, the same components are denoted by the same reference characters. Their functions and names are also the same. Therefore, detailed description thereof will not be repeated. In the following description, it is assumed that the image forming apparatus in accordance with the present invention is an MFP. The present invention, however, is not limited to an MFP, and it may be applicable to any apparatus that can use an address book and attains the function of an image communication mode (facsimile communication mode, Internet facsimile communication mode, electronic mail communication mode (scan-to-mail) and the like) for exchanging image data. Therefore, an MFP having only the image communication mode (that does not form any image but simply transmits an image) may be encompassed by the image forming apparatus here. In the following description, "facsimile", "fax" and "FAX" are used not specifically distinguished from each other.

First Embodiment

[Image Forming Apparatus (Hardware)]

Figure 2:
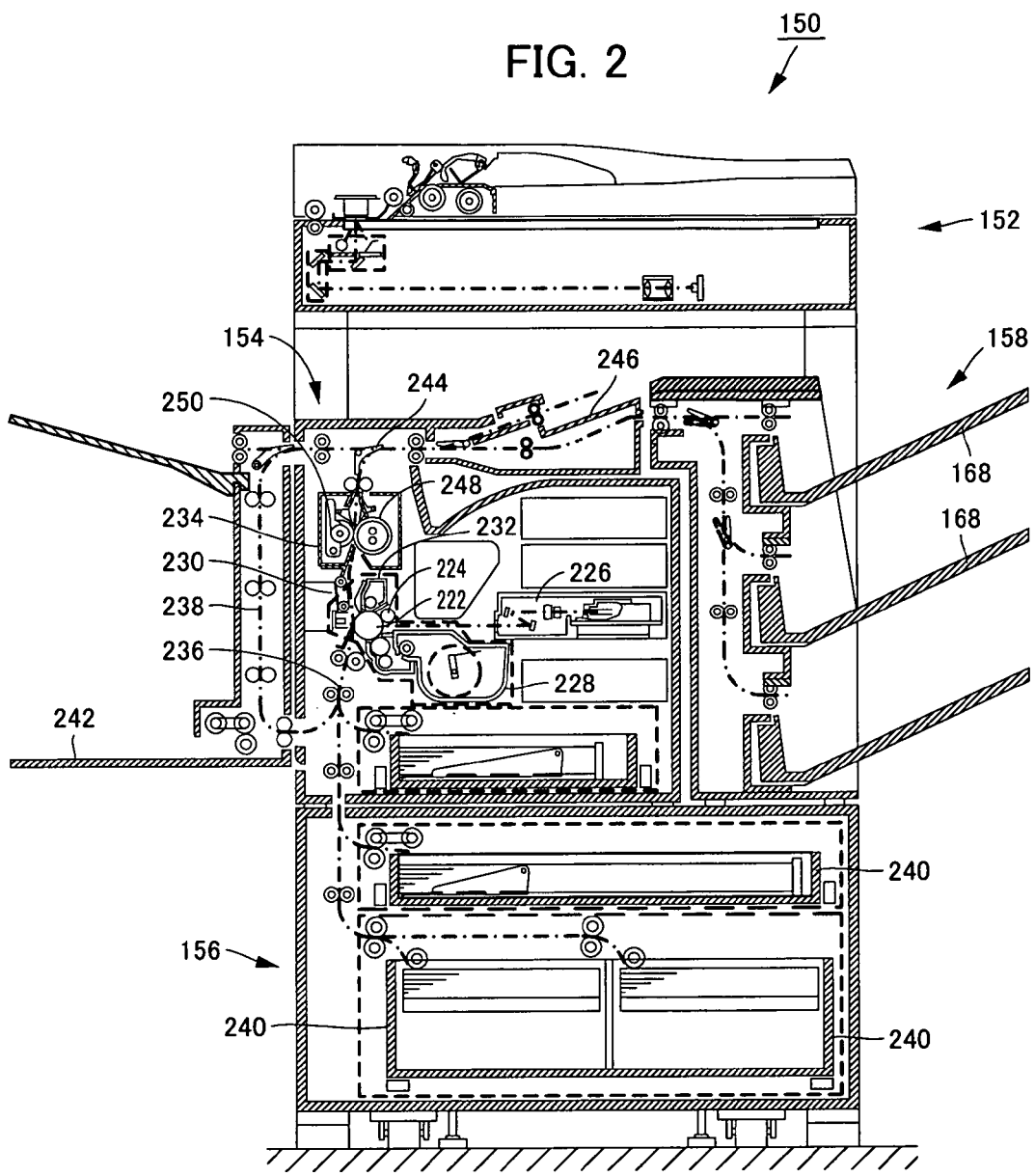
FIG. 2 schematically shows an internal configuration of image forming apparatus 150 shown in FIG. 1.

Referring to FIGS. 1 and 2, an image forming apparatus 150 as the image communication apparatus in accordance with a first embodiment of the present invention includes a document reading unit 152, an image forming unit 154, a paper feed unit 156, and a discharge processing device 158.

In the following, an operation in the facsimile communication mode will be described for describing an internal configuration of image forming apparatus 150. In the facsimile communication mode (also referred to as a facsimile/image transmission mode), a document reading unit (scanner unit) 152 and FAX communication unit 155 mainly operate for the transmitting operation and FAX communication unit 155 and an image forming unit 154 mainly operate for the receiving operation, whereby the facsimile communication operation is realized. The operations in the Internet facsimile function and the electronic mail transmission function (scan-to-mail) are substantially similar in the sense that image data is the object of communication, though the destination is not a FAX number but a computer address or a mail address, and the communication interface is not FAX communication unit 155 but network IF 304.

—Transmission Operation—

In image forming apparatus 150, when a user designates the facsimile/image transmission mode, designates a destination and presses a start button, a document placed on a platen is read as image data by document reading unit 152. The read image data is input to CPU (Central Processing Unit) 300 shown in FIG. 3, formed of a microcomputer or the like, and the image data is subjected to various image processing operations. The resulting image data is output to the FAX communication unit 155. When designating an address, it is possible to designate an address (facsimile number or mail address; here, a facsimile number) registered in advance, using a shared address book or a personal address book.

FAX communication unit 155 of image forming apparatus 150 on the transmitting side connects a line to a designated transmission destination, converts the image data to communication data in compliance with facsimile transmission standard, and transmits the converted data to a facsimile machine on the receiving side (for example, image forming apparatus 150 having the facsimile function).

—Communication Operation—

When the line is connected, FAX communication unit 155 of image forming apparatus 150 on the receiving side detects a communication request signal from FAX communication unit 155 of image forming apparatus 150 on the transmitting side, and transmits an acknowledgement signal. Thereafter, by way of example, FAX communication units 155 of the transmitting side and receiving side pass performance information supported by each other, determine highest possible speed of communication and method of coding/code correction of image data, and set the method of communication of modems. Then, using the image signal format in accordance with the communication method, data is transmitted from FAX communication unit 155 of image forming apparatus 150 on the transmitting side to FAX communication unit 155 of image forming apparatus 150 on the receiving side. When transmission ends, the line is disconnected.

—Receiving Operation—

FAX communication unit 155 of image forming apparatus 150 on the receiving side converts the received data to image data and passes the data to image forming unit 154. A configuration in which the received data is converted to image data by image forming unit 154 is also possible.

Image forming unit 154 is for printing an image of the document represented by the image data on a recording medium, and it includes, by way of example, a photoreceptor drum 222, a charger 224, a laser scanning unit (hereinafter also denoted as LSU) 226, a developer 228, a transfer device 230, a cleaning device 232, a fixing device 234 and a neutralizer, not shown.

In image forming unit 154, a main feeding path 236 and a reverse feeding path 238 are provided, and a sheet of recording paper fed from paper feed unit 156 is fed along main feeding path 236. Paper feed unit 156 draws out sheets of recording paper stacked on a paper feed cassette 240 or on a manual feed tray 242 one by one, and feeds the sheet of paper to main feeding path 236 of image forming unit 154.

While the sheet of recording paper is fed along main feeding path 236 of image forming unit 154, the sheet passes between photoreceptor drum 222 and transfer device 230, and further passes through fixing device 234, whereby printing is done on the sheet of recording paper.

Photoreceptor drum 222 rotates in one direction, and its surface is cleaned by cleaning device 232 and the neutralizer and, thereafter, uniformly charged by charger 224.

LSU 226 modulates the laser beam based on the image data to be printed, and repeatedly scans the surface of photoreceptor drum 222 with the laser beam in a main scanning direction, whereby an electrostatic latent image is formed on the surface of photoreceptor drum 222.

Developer 228 develops the electrostatic latent image by supplying toner to the surface of photoreceptor drum 222, and thus, a toner image is formed on the surface of photoreceptor drum 222.

Transfer device 230 transfers the toner image on the surface of photoreceptor drum 222 to the sheet of recording paper passing between transfer device 230 and the photoreceptor drum 222.

Fixing device 234 includes a heating roller 248 for heating the sheet of recording paper and a pressure roller 250 for pressing the sheet of recording paper. As the sheet of recording paper is heated by heating roller 248 and pressed by pressure roller 250, the toner image that has been transmitted to the recording paper is fixed on the sheet of recording paper.

At a position of connection between main feeding path and reverse feeding path 238, a separation pawl 244 is arranged. When printing is done only on one side of the sheet of recording paper, separation pawl 244 is so positioned that the sheet of recording paper fed from fixing device 234 is guided to paper discharge tray 246 or to discharge processing device 158.

When printing is done on both sides of the sheet of recording paper, separation pawl 244 is turned to a prescribed direction, so that the sheet of recording paper is guided to reverse feeding path 238. The sheet of recording paper passes through reverse feeding path 238, turned upside-down and again fed to main feeding path 236, and while it is again fed along main feeding path, printing is done on its rear surface, and the sheet is guided to discharge tray 246 or to discharge processing device 158.

The sheet of recording paper on which printing is done in the above-described manner is guided to discharge tray 246 or to discharge processing device 158, and discharged to discharge tray 246 or to any of the discharge trays 168 of discharge processing device 158.

In the image forming apparatus in accordance with the present embodiment, (1) at the time of image transmission (fax/image transmission mode), a destination for transmitting image data is designated by using an address book (a shared address book or a personal address book) in which facsimile numbers and/or mail addresses are registered in advance, (2) even an address registered in the address book is automatically moved to a save folder (temporary saving folder) if its frequency of use is low, (3) if an address moved to the save folder is designated as a destination or if the user requests restoring of it, the address is returned to the original address book, and (4) if conditions for deletion are satisfied, an address that has been moved to the save folder is deleted from the address book. As described above, image forming apparatus 150 in accordance with the present embodiment is characterized in that the address book is maintained to allow the user to appropriately designate an image transmission destination.

Such a characteristic is realized by the hardware configuration of image forming apparatus 150 as well as the hardware and software controlling image forming apparatus 150. In the following, first, the hardware configuration (control block) included in image forming apparatus 150 for executing the control will be described, followed by the description of the software configuration (program).

[Image Forming Apparatus (Control Block)]

Figure 3:
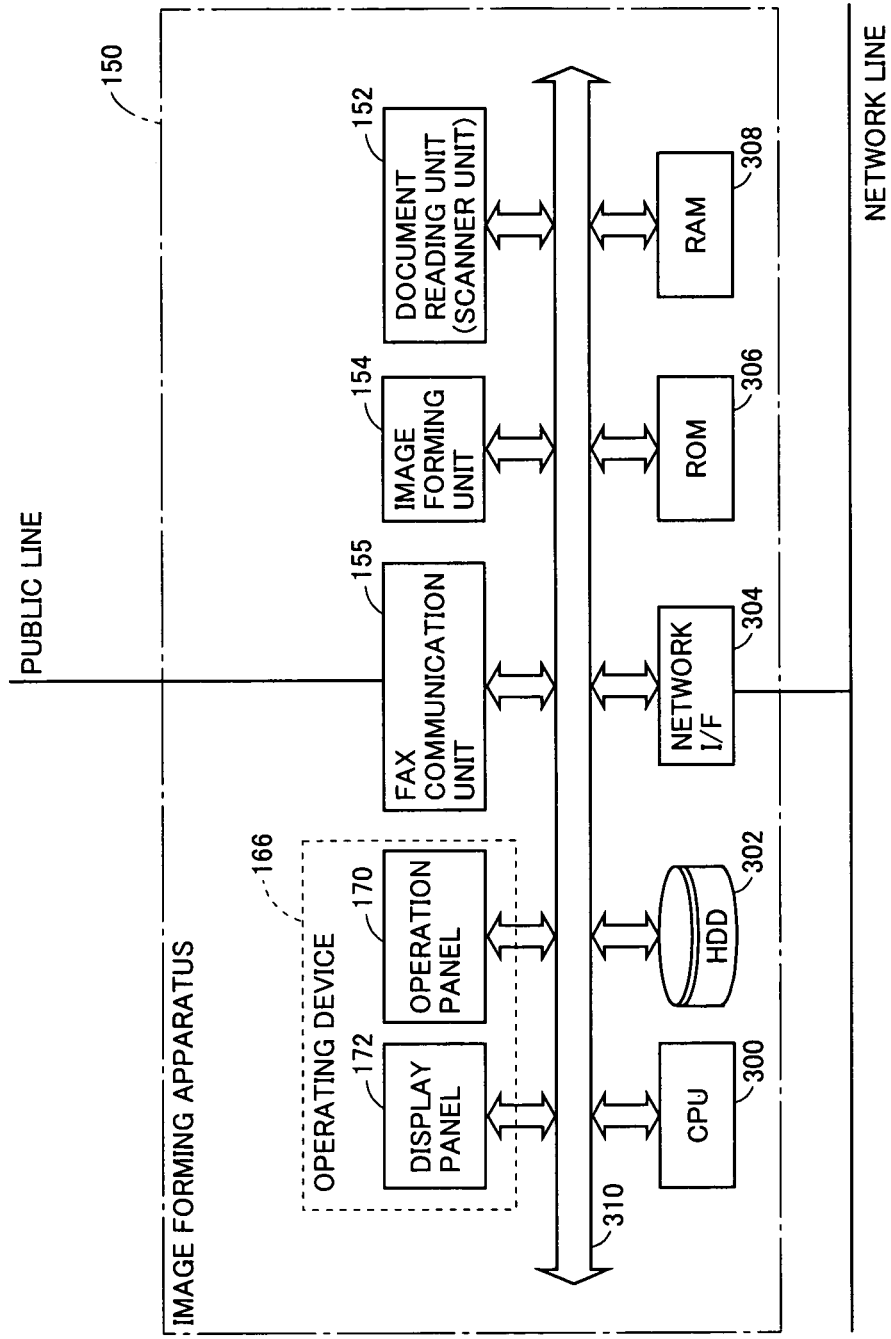
FIG. 3 is a functional block diagram showing a hardware configuration of image forming apparatus 150 shown in FIG. 1.

Referring to FIG. 3, image forming apparatus 150 includes: an operating device 166 allowing settings related to the copy function, facsimile function and scanner function; an ROM (Read Only Memory) 306 for storing programs and the like; a hard disk 302 as a non-volatile storage area capable of storing programs and data; and an RAM (Random Access Memory) 308 for providing a storage area when a program is executed. When the power is turned on, some data stored in hard disk 302 are transferred to RAM 308. Various tables described later are stored in hard disk 302 or RAM 308.

Image forming apparatus 150 further includes a bus 310 connected to document reading unit 152, image forming unit 154, FAX communication unit 155, operating device 166, ROM 306, hard disk 302 and RAM 308, and a CPU 300 connected to bus 310, for realizing general functions as the image forming apparatus.

ROM 306 stores programs and data necessary for controlling operations of image forming apparatus 150. CPU 300 controls image forming apparatus 150 in accordance with the programs and data stored in ROM 306, and executes control related to various functions of image forming apparatus 150.

As shown in FIG. 3, to FAX communication unit 155 of image forming apparatus 150, a public line is connected for transmitting/receiving image data, and to network IF 304, a network line is connected. To the network line, a computer or the like using image forming apparatus 150 as a network-supported printer, or a computer or the like capable of transmitting/receiving a mail through the Internet may be connected.

RAM 308 provides a function of a working memory for temporarily storing results of operations and processes by CPU 300, and a function of a frame memory for storing image data.

Document reading unit 152, image forming unit 154, a flat, plate-shaped operation panel 170 and display panel 172 of operating device 166, ROM 306, hard disk 302 and RAM 308 are controlled by CPU 300 executing a prescribed program.

Operating device 166 includes: a plate-shaped operation panel 170 arranged on the right side on a surface of operating device 166, provided with hardware keys including ten keys and various other operation buttons; and a display panel 172 formed of a small, touch-panel liquid crystal display device, arranged on the central to the left side of operating device 166. Operation panel 170 and display panel 172 are held in one housing, and operating device 166 is formed integrally to be one piece.

On display panel 172 of operating device 166, the state of image forming apparatus 150, facsimile destination designating status, job processing status and the like are displayed (blank portion on the left side of FIG. 14 as will be described later). Further, an address registered in the address book is displayed on display panel 172. On a display area of liquid crystal display device of display panel 172, selection buttons are displayed. When a portion where the selection button is displayed is pressed, the pressed position is detected by the touch panel. By comparing the display position of the selection button and the position where the touch panel is pressed using a program, setting of a function or instruction of an operation of image forming apparatus 150 becomes possible.

In image forming apparatus 150 in accordance with the present embodiment, information (destination name, destination facsimile number, destination mail address) of a transmission destination to which a facsimile is to be transmitted (or a transmission destination to which image data is transmitted by mail) is registered in the address book in advance, and the transmission destination can be designated by speed dial or abbreviate dial. For this purpose, in hard disk 302 or RAM 308, an address registration table having such fields as shown in FIG. 4 is stored.

Referring to FIG. 4, the address registration table, in which a registration number (Reg. No.) for each address is used as a key, at least includes: a field for storing a display name of an address; a field for storing a facsimile number of the address; a field for storing a mail address of the address; a field for storing a flag (hereinafter referred to as a publication flag) indicating whether or not the address is made public (whether or not it should be posted on the shared address book); a flag (hereinafter referred to as a save flag) indicating whether or not the address is to be saved (whether or not the address should be moved to a save folder if save conditions are satisfied); and a user ID of the user who registered the address. The user ID represents a piece of information uniquely identifying the user who uses the image forming apparatus (for example, a company member number).

That the publication flag is set to "1" means that the address is made public (posted) on the shared address book, and that the publication flag is set to "0" means that the address is not made public (not posted) on the shared address book and listed only on the personal address book. That the save flag is set to "1" means that the address is moved to the save folder if save conditions are satisfied, and that save flag is set to "0" means that the address is not moved to the save folder even if save conditions are satisfied.

In FIG. 4, the registration number (call number) is designated by a three-digit number. By pressing the three-digit number by using ten-keys, a destination can be designated. Designation of a destination in this manner is referred to as abbreviated dial. The three-digit number can be related to a destination name displayed on display panel 172. When the destination name is displayed on the touch panel and the destination name is pressed by the user, the destination can be designated by the related three-digit number. Designation of a destination in this manner is referred to as speed dial. The abbreviated dial and speed dial are not limited to the above. The difference between the abbreviated dial and speed dial is not directly related to the characteristic portion of the present invention and, therefore, these are described not particularly distinguished from each other unless so specified.

In image forming apparatus 150 in accordance with the present embodiment, in order to maintain the address registration table shown in FIG. 4 and thereby to display an appropriate address book to the user, an address use management table including such fields as shown in FIG. 5 is stored in hard disk 302 or in RAM 308.

Referring to FIG. 5, in the address use management table also, the registration number (Reg. No.) for each address is used as a key, as in FIG. 4. The address use management table at least includes: a field storing "normal" (not moved to save folder) or "saved" (moved to save folder) indicating the present state of the address; a field storing a month (season) in which the address was used with high frequency before determination that the address is to be saved (before save conditions are satisfied); and a plurality of fields storing use history (date and time of use and user ID) in which the address is designated as a destination. A month in which an address was used frequently (designated as destination) is determined by accumulating the monthly number of designations, and the season is determined by accumulating the number of designations in corresponding three months.

That the present state is "normal" means that the address is displayed in a normal folder of the address book, and that the present state is "saved" means that it is displayed in the save folder of the address book. The seasons are classified to December to February (winter), March to May (spring), June to August (summer) and September to November (autumn). The classification is not limited thereto, and the year may be classified to January to March, April to June, July to September and October to December. Further, the unit of classification is not limited to three months.

Among the plurality of fields storing the use history (date and time of use, and user ID), the use history (n) consists of the date and time (n) and the user ID (n) (n is a natural number). The address use management table stores the use history in time-sequential order of use (designation as destination). In the following, it is assumed that the use history (n) is newer than use history (n+1). Therefore, use history (1) (date and time of use (1), user ID (1)) represents the use history of the address most-recently designated as a destination.

Image forming apparatus 150 in accordance with the present embodiment includes: a transmission unit for transmitting image data to an apparatus other than itself, an auto-save unit for automatically moving an address that satisfied save-conditions in the address book to the save folder; an auto-restore unit for moving (restoring) the address in the save folder that satisfied restore conditions to the original address book; a manual restore unit for restoring an address in the save folder to the original address book by the user operation; and a deletion unit for deleting an address in the save folder that satisfies deletion conditions from a storage unit (hard disk 302) of image forming apparatus 150. The transmission unit, auto-save unit, auto-restore unit and the deletion unit may be implemented as hardware. In the present embodiment, however, these are realized by software as will be discussed in the following.

[Software Configuration]

FIGS. 6 to 10 are flowcharts representing control structures of the programs (transmission program, auto-save program, auto-restore program, manual restore program and deletion program) executed by image forming apparatus 150. These programs are subroutine programs called in a main routine controlling the overall operation of image forming apparatus 150. When these programs end, the flow returns to a program, not shown, from which the present program was called. In these programs, the same process steps are denoted by the same step numbers and, since the processes are the same, detailed description thereof will not be repeated.

CPU 300 of image forming apparatus 150 executes, in parallel with such a program, a program for realizing general functions of a computer or an image forming apparatus. The program, however, is not directly related to the characteristic portion of the present invention and, therefore, details thereof will not be described here.

When a user is to use image forming apparatus in accordance with the present embodiment, the user must log-in. When the user touches the operation panel of image forming apparatus 150, a log-in image is displayed. When the user inputs a correct combination of a user ID and a password using the image, log-in of the user is permitted. If a fingerprint authentication device is incorporated in image forming apparatus 150, the user inputs his/her fingerprint by placing his/her finger on the fingerprint authentication device, and if authorized by the fingerprint authentication device, log-in of the user is permitted. The user ID of logged-in user is stored in image forming apparatus 150. When log-in is complete, an initial image allowing selection of main operation modes is displayed on display panel 172 of the image forming apparatus.

It is assumed that image forming apparatus 150 has three modes, that is, "copy mode," "fax/image transmission mode" and "document filing mode." Buttons for selecting these modes are displayed on the initial image. These buttons are software buttons (tab buttons) displayed at the uppermost portion of display panel 172. If any of these buttons is pressed, it is determined that the user designated a mode, and the program corresponding to the selected mode is activated. Image forming apparatus 150 may have the printer mode as an additional operation mode.

In the following, a process when a cancel key is pressed and a process when a prescribed time period passed without any operation are not described in detail, for simplicity of description.

—Transmission Program—

Figure 6:
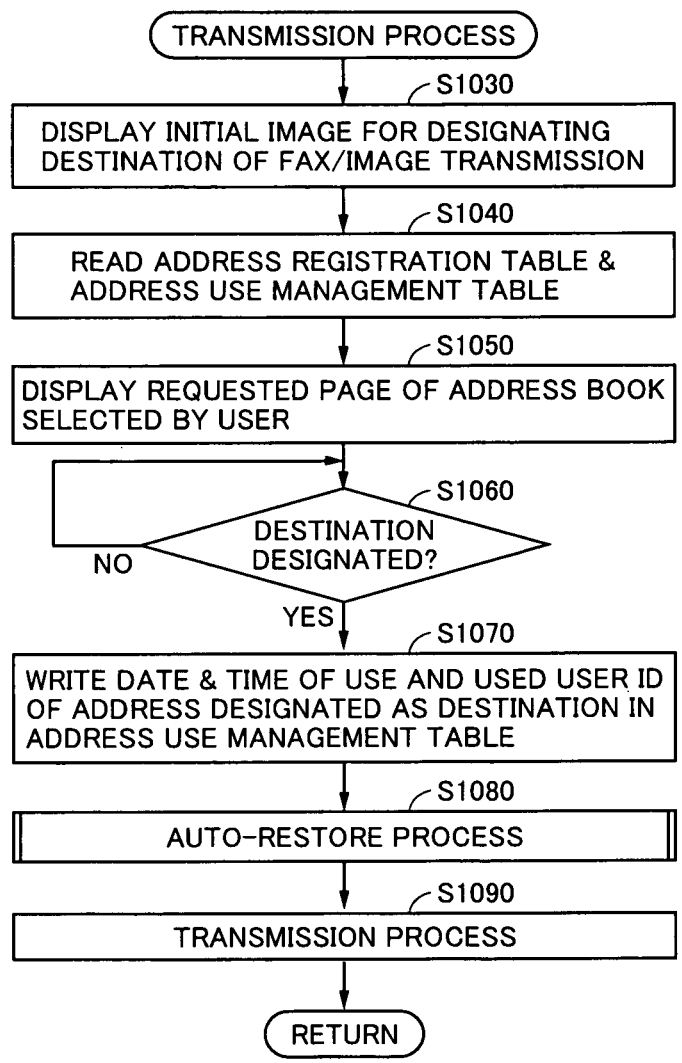
FIG. 6 is a flowchart representing a control structure of a transmission program executed by the image forming apparatus in accordance with a first embodiment of the present invention.

The program having the control structure shown in FIG. 6 is called when "fax/image transmission mode" button is pressed. Referring to FIG. 6, at step (hereinafter "step" will be denoted as "S") 1030, CPU 300 displays an initial image designating a destination of fax/image transmission. At S1040, CPU 300 reads the address registration table (FIG. 4) and the address use management table (FIG. 5).

At S1050, based on the read table, CPU 300 displays a page requested by the user of an address book designated by the user (either the shared address book or the personal address book), overlapped on the initial image displayed at S1030. Here, together with the addresses of a normal folder in the address book, a "save folder" button is displayed. When the "save folder" button is pressed, an address or addresses of the save folder in the address book is displayed. Whether an address is displayed in the normal folder or save folder is determined based on the state of the address stored in the address use management table (FIG. 5). It is possible to designate by a tab, whether the shared address book or the personal address book is to be displayed. The process steps of S1030 and 1050 may not be carried out separately, and these processes may be done simultaneously after the process of S1040.

At S1060, CPU 300 determines whether or not the destination of fax/image transmission has been designated. Here, if an address displayed on display panel 172 is pressed and "destination OK" button is pressed, CPU 300 determines that a destination is designated. If it is determined that a destination of fax/image transmission is designated (YES at S1060), the process proceeds to S1070. Otherwise (NO at S1060), the process returns to S1060, and waits until it is determined that a destination of fax/image transmission is designated.

At S1070, CPU 300 writes the date and time of use and the used user ID (logged-in user ID) of the address designated as the destination of fax/image transmission, in the address use management table.

At S1080, CPU 300 executes the auto-restore process (subroutine). Details of the auto-restore process will be described later. At S1090, CPU 300 executes the transmission process.

—Auto-Save Program—

The auto-save program is activated at every predetermined period (for example, every 24 hours).

Figure 7:
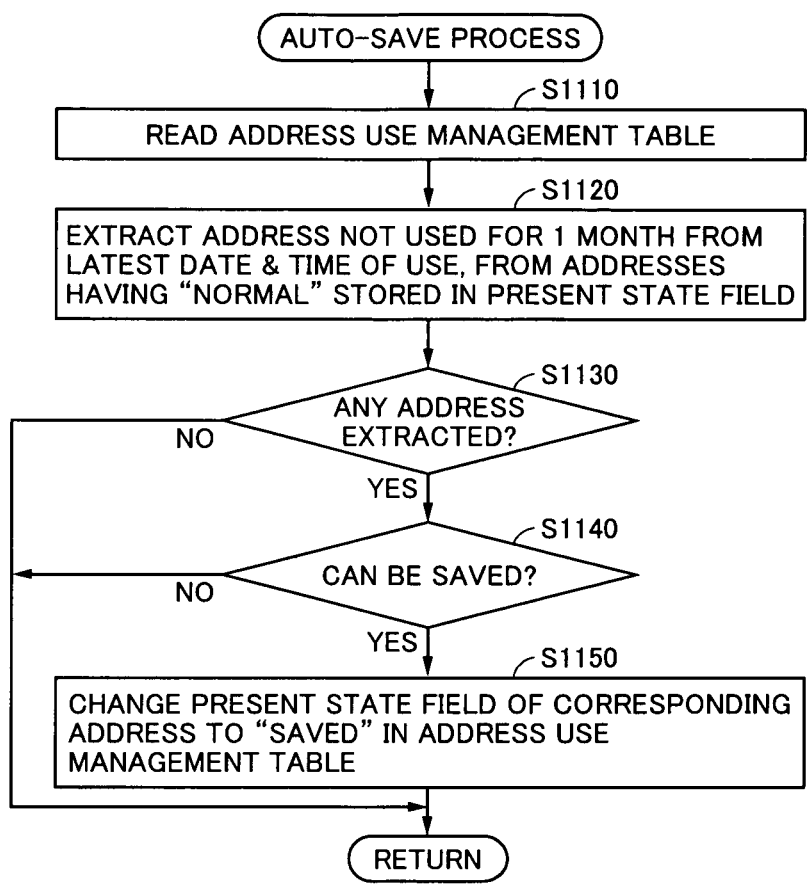
FIG. 7 is a flowchart representing a control structure of an auto-save program executed by the image forming apparatus in accordance with the first embodiment of the present invention.

Referring to FIG. 7, at S1110, CPU 300 reads the address use management table (FIG. 5). At S1120, CPU 300 extracts an address or addresses which are not used for more than one month from the latest date and time of use, among the addresses having "normal" stored in the field representing the present state of the address. In FIG. 5, the use history (n) is newer than the use history (n+1) and, therefore, an address which is not used for more than one month from the date and time of use (1) of the latest use history (1) is extracted.

At S1130, CPU 300 determines whether or not there is an extracted address. If it is determined that there is an extracted address (YES at S1130), the process proceeds to S1140. Otherwise (NO at S1130), the process ends.

At S1140, CPU 300 determines whether or not the extracted address can be moved to the save folder (can be saved or not). Here, CPU 300 determines whether or not the movement to save folder is possible based on the state of save flag ("1" or "0") of the address registration table (FIG. 4). If it is determined that extracted address can be moved to the save folder (save flag is set to "1", YES at S1140), the process proceeds to S1150. Otherwise (save flag is set to "0", NO at S1140), the process ends.

At S1150, CPU 300 changes the indication "normal" of the field representing the present state of the corresponding address to "saved" in the address use management table (FIG. 5). The processes of S1140 and S1150 are executed on all addresses extracted by the process of S1120.

—Auto-Restore Program—

Figure 8:
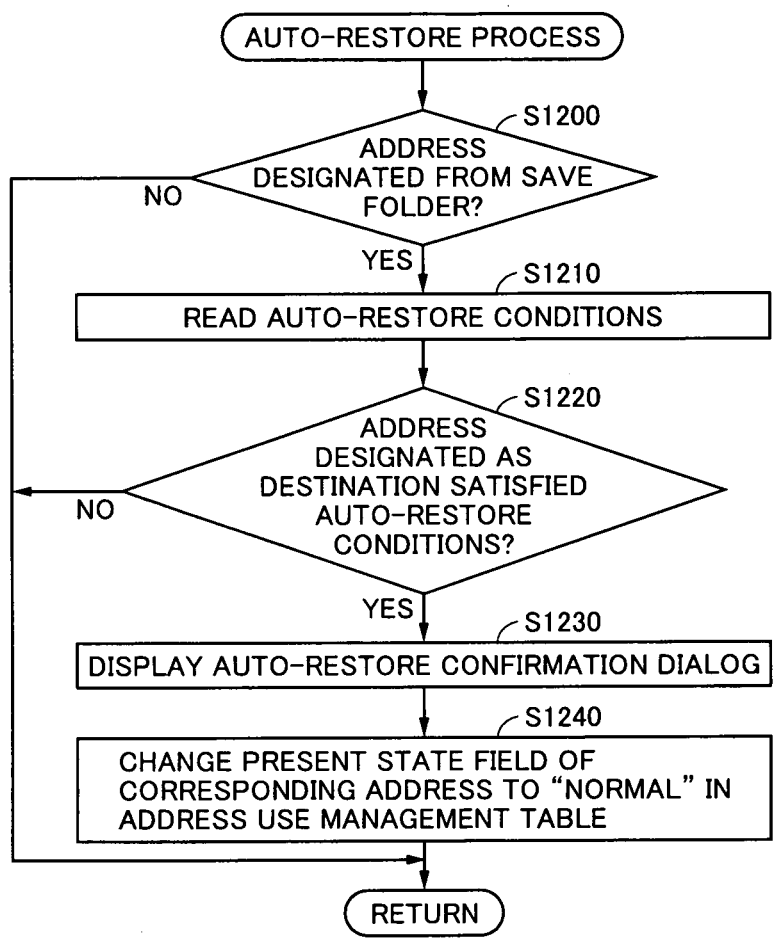
FIG. 8 is a flowchart representing a control structure of an auto-restore program executed by the image forming apparatus in accordance with the first embodiment of the present invention.

Referring to FIG. 8, the subroutine program of S1080 shown in FIG. 6 will be described. At S1200, CPU 300 determines whether or not a destination of fax/image transmission is designated from an address that has been moved to the save folder. If it is determined that the destination of fax/image transmission is designated from an address that has been moved to the save folder (YES at S1200), the process proceeds to S1210. Otherwise (NO at S1200), the process ends.

At S1210, CPU 300 reads auto-restore conditions. The auto-restore conditions are set by a system administrator and stored in hard disk 302 or RAM 308. Here, as the auto-restore conditions, "one user designated an address moved to save folder 10 times," or "unspecified users designated an address moved to save folder 5 times," are set for the shared address book. For a personal address book, "one user (the owner and user of the address book) designated an address moved to save folder 3 times" is set. When these conditions are satisfied, the corresponding address is returned to the original address book. As the auto-restore conditions, the number of designations by a specific user may be set. In that case, if an address is designated only once by the specific user, the address will be returned and, therefore, it is simply a setting of the user. If only the number of designations is set without regard to whether it is by the same user or a plurality of users, it is only a setting of the number.

At S1220, CPU 300 determines whether or not the address designated as the destination of fax/image transmission satisfies the auto-restore conditions. At this time, CPU 300 determines whether or not the auto-restore conditions are satisfied, based on the history of use after the date and time of movement to the save folder, stored in the address use management table (FIG. 5). More specifically, for the shared address book, if the present designation of fax/image transmission is the tenth designation by the same user after the date and time of movement to the save folder, the auto-restore conditions are determined to be satisfied. Alternatively, for the shared address book, if the present designation of fax/image transmission is the fifth designation by different users after the date and time of movement to the save folder, the auto-restore conditions are determined to be satisfied. For the personal address book, if the present designation of fax/image transmission is the third designation by the owner (user) of the personal address book after the date and time of movement to the save folder, the auto-restore conditions are determined to be satisfied. If it is determined that the auto-restore conditions are satisfied (YES at S1220), the process proceeds to S1230. Otherwise (NO at S1220), the process ends.

At S1230, CPU 300 displays an auto-restore confirmation dialog, confirming auto-restore of the address from the save folder to the normal folder, on display panel 172.

At S1240, CPU 300 changes the indication "saved" of the field representing the present state of the corresponding address (address as the object of auto-restore) to "normal" in the address use management table (FIG. 5).

—Manual Restore Program—

Figure 9:
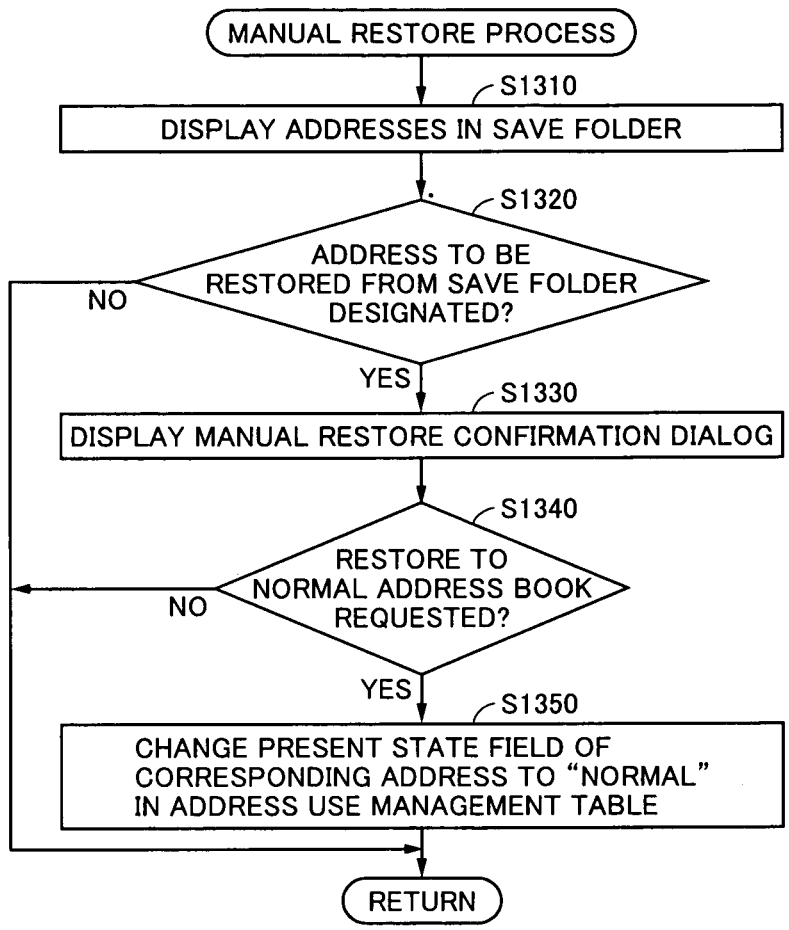
FIG. 9 is a flowchart representing a control structure of a manual restore program executed by the image forming apparatus in accordance with the first embodiment of the present invention.

The manual restore program having the control structure shown in FIG. 9 is activated when the "save folder" button, displayed on display panel 172 together with the addresses of normal folder of the address book, no matter whether it is the shared address book or a personal address book, is pressed. Specifically, detecting that the "save folder" button displayed on display panel 172 is pressed, CPU 300 determines that a request to display the save folder is detected, and it activates the manual restore program.

At S1310, CPU 300 displays an address or addresses that have been moved to the save folder, on display panel 172. Here, for a personal address book, any address having the publication flag of "0" and the present state of "saved" in the address use management table of FIG. 5 is extracted. Information corresponding to the extracted address of which registered owner ID matches the logged-in user ID is read from the address registration table shown in FIG. 4 and displayed on display panel 172. For a shared address book, any address having the publication flag of "1" and the present state of "saved" in the address use management table of FIG. 5 is extracted. Information corresponding to the extracted address is read from the address registration table shown in FIG. 4 and displayed on display panel 172.

At S1320, CPU 300 determines whether or not an address to be restored from the save folder to the normal folder has been designated. Here, if an address displayed on display panel 172 is pressed and "return to normal" button is pressed, CPU 300 determines that an address to be returned from the save folder to the normal folder is designated. When the address to be returned from the save folder to the normal folder is designated (YES at S1320), the process proceeds to S1330. Otherwise (NO at S1320), the process ends. It is NO at S1320 if any address to be returned from the save folder to the normal folder is not designated in a prescribed time period.

At S1330, CPU 300 displays a manual restore confirmation dialog, confirming manual restore of an address from the save folder to the normal folder on display panel 172. Here, on display panel 172, a message asking an input as to whether the address "005", for example, is to be returned from the save folder to the normal folder is displayed.

At S1340, CPU 300 determines whether or not a request for manually restoring an address in the save folder to the normal folder is detected. Here, if the "YES" button of "YES/NO" button displayed together with the message asking an input as to whether the address "005" is to be returned from the save folder to the normal folder is pressed, it determines that the request for manually restoring the address in the save folder to the normal folder is detected. If it is determined that the request for manually restoring the address in the save folder to the normal folder is detected (YES at S1340), the process proceeds to S1350. Otherwise (NO at S1340), the process ends.

At S1350, CPU 300 changes the indication "saved" of the field representing the present state of the corresponding address (address as the object of manual restore) to "normal" in the address use management table (FIG. 5).

—Deletion Program—

Figure 10:
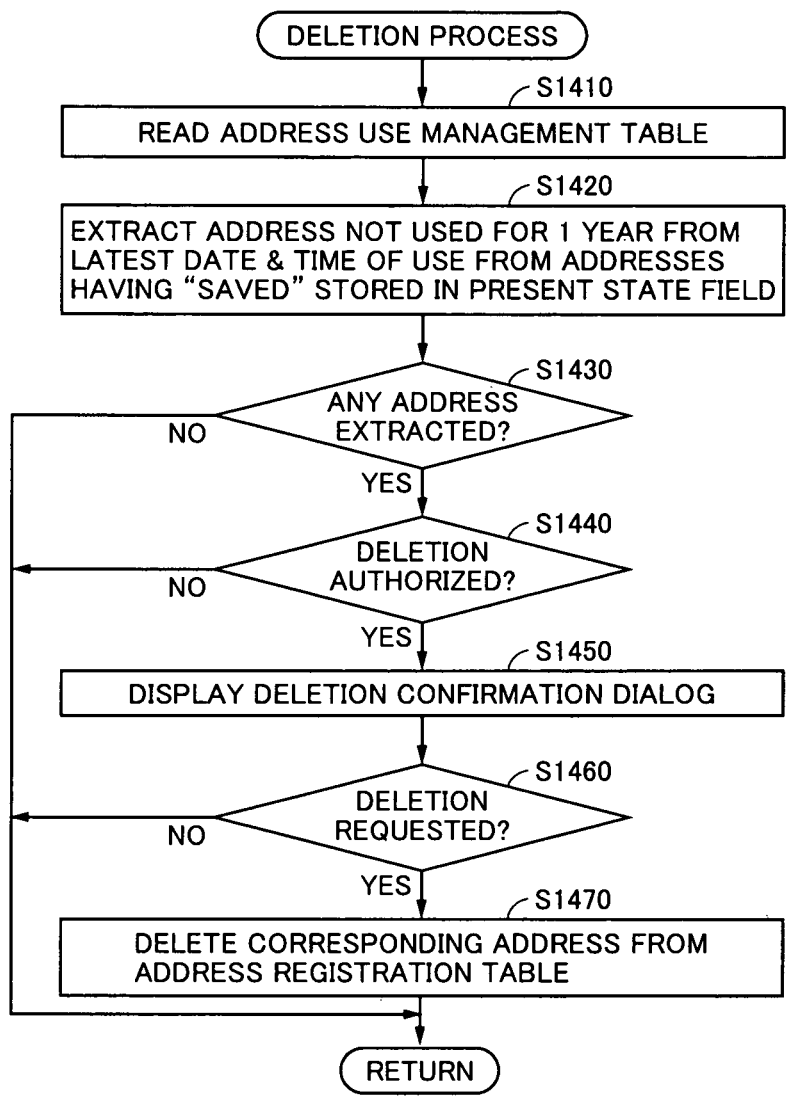
FIG. 10 is a flowchart representing a control structure of a deletion program executed by the image forming apparatus in accordance with the first embodiment of the present invention.

The deletion program having the control structure shown in FIG. 10 is periodically activated, for example, once a month.

Referring to FIG. 10, when the deletion program is activated, at S1410, CPU 300 reads the address use management table (FIG. 5). At S1420, CPU 300 extracts any address which is not used for one year from the latest date and time of use, among the addresses having "normal" stored in the field representing the present state of the corresponding address. In the present embodiment, the use history (n) is newer than use history (n+1). Therefore, an address which is not used for one year from date and time of use (1) of use history (1) is extracted.

At S1430, CPU 300 determines whether or not there is any extracted address. If it is determined that there is an extracted address (YES at S1430), the process proceeds to S1440. Otherwise (NO at S1430), the process ends.

At S1440, CPU 300 determines whether or not the logged-in user is authorized to delete the extracted address. If the logged-in user is an administrator, the logged-in user is authorized to delete every registered address of all address books. A logged-in user who is not an administrator is authorized to delete an address registered by himself/herself. If it is determined that deletion is authorized (YES at S1440), the process proceeds to S1450. Otherwise (NO at S1440), the process ends.

At S1450, CPU 300 displays a deletion confirmation dialog confirming deletion of the address that was not used for the past one year after moved to the save folder, on display panel 172. Here, on display panel 172, a message asking an input as to whether the address "099", for example, is to be deleted from the image forming apparatus is displayed.

At S1460, CPU 300 determines whether or not a request for deleting the address in the save folder is detected. Here, if the "YES" button of "YES/NO" button displayed together with the message asking an input as to whether the address "099" is to be deleted from the image forming apparatus is pressed, it determines that the request for deleting the address in the save folder is detected. If it is determined that the request for deleting the address in the save folder is detected (YES at S1460), the process proceeds to S1470. Otherwise (NO at S1460), the process ends.

At S1470, CPU 300 deletes the corresponding address in the address registration table (FIG. 4).

[Operation]

An operation of image forming apparatus 150 in accordance with the present embodiment based on the configuration and flowcharts above will be described with reference to FIGS. 11 to 21.

—System Setting Operation—

Figure 11:
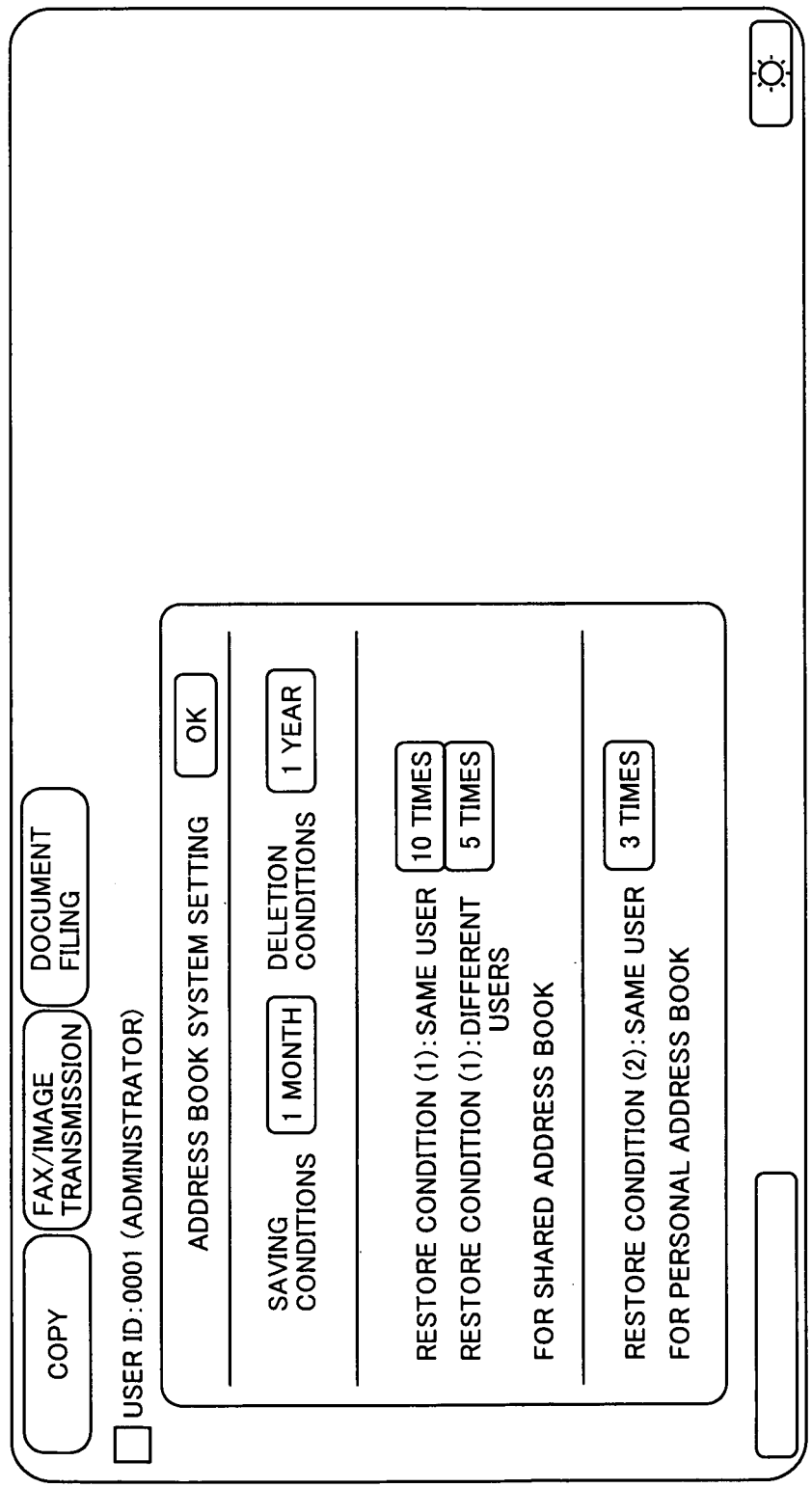
FIG. 11 shows a system setting dialog displayed on a display panel 172 shown in FIG. 3.

FIG. 11 shows a system setting image related to address books stored in image forming apparatus 150, displayed on display panel 172 of image forming apparatus 150. The system setting image can be operated only by a user who logged-in as an administrator.

FIG. 11 shows a setting dialog allowing the administrator to input information as to how the address books in image forming apparatus 150 are to be managed, displayed on display panel 172 of image forming apparatus 150.

Referring to FIG. 11, the setting dialog includes, as system setting items, save conditions of moving an address not used for a prescribed time period after the latest date and time of use (here, set to be one month) to the save folder, deletion conditions of deleting an address not used for a prescribed time period after the latest date and time of use (here, set to be one year) from image forming apparatus 150, and restore conditions of automatically restoring an address designated for a prescribed number of times as a destination of fax/image transmission in the save folder to the normal folder of the original address book. Here, as restore conditions (1), "one user designated an address moved to save folder 10 times," or "unspecified users designated an address moved to save folder 5 times," are set for the shared address book, and as restore conditions (2), "one user (the owner and user of the address book) designated an address moved to save folder 3 times" is set for the personal address book.

The save conditions, deletion conditions and restore conditions set by the administrator using the system setting dialog shown in FIG. 11 are stored in hard disk 302 or RAM 308.

—Address Registration Operation—

Figure 12:
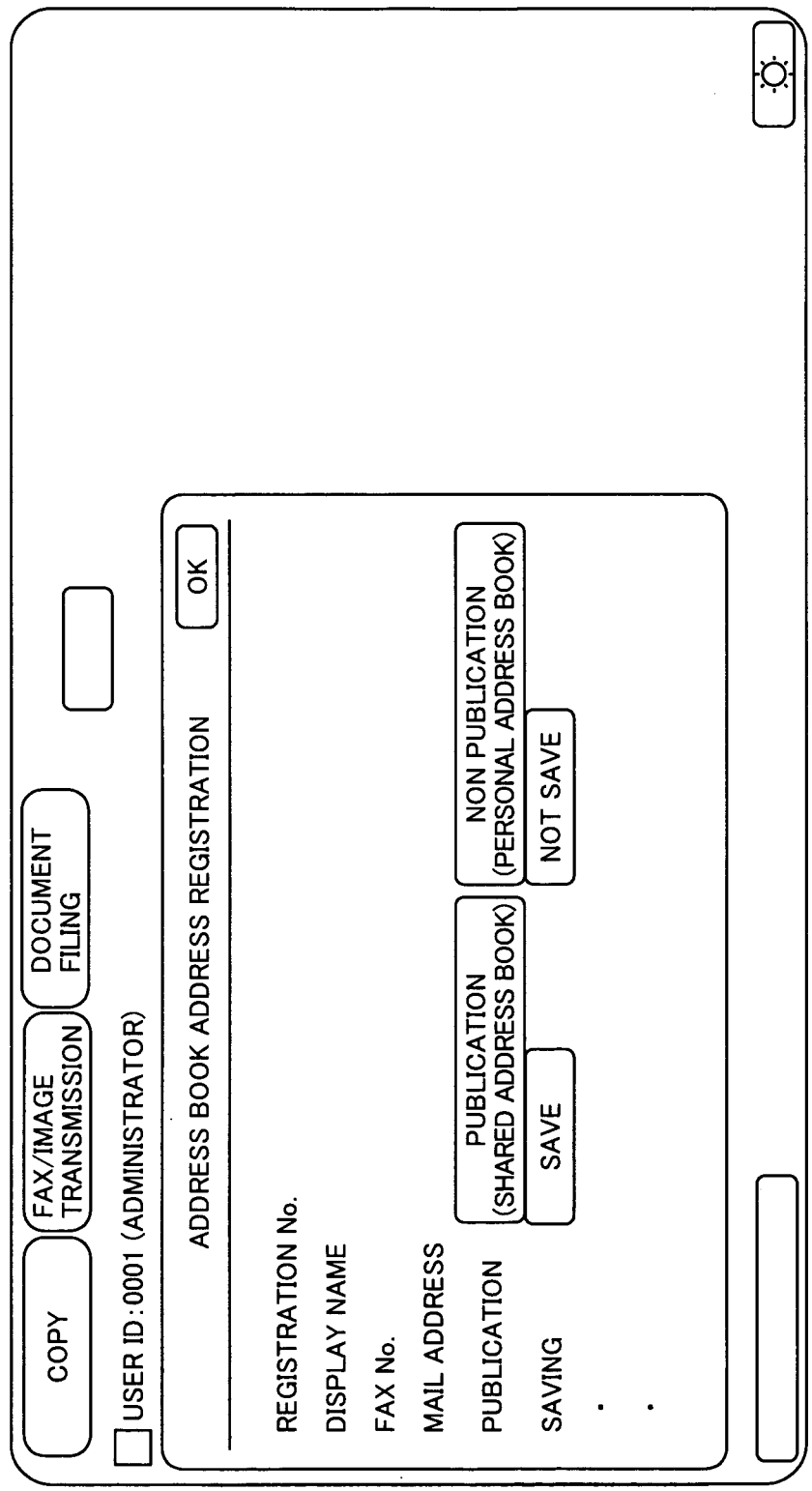
FIG. 12 shows an address registration dialog displayed on a display panel 172 shown in FIG. 3.

FIG. 12 shows an address registration dialog of an address book stored in image forming apparatus 150, displayed on display panel 172 of image forming apparatus 150.

Referring to FIG. 12, the address registration dialog can be operated by a logged-in user. In the address registration image, items corresponding to the fields of address registration table shown in FIG. 4 are set. The registration number (Reg. No.) may be automatically allotted by the system.

For one registration number (Reg. No.), one address is registered. Items of registration include display name, FAX number, mail address, publication flag and save flag. At least one of FAX number and mail address must be set.

If the user registering the address is willing to publish (post) the address on the shared address book, the user presses "publication (shared address book)" button. Then, the publication flag is set to "1". If the user registering the address does not want to have the address published (posted) on the shared address book, the user presses "non-publication (personal address book)". Then, the publication flag is set to "0". If the publication flag is set to "1", the address is published (posted) on the shared address book, and if the publication flag is set to "0", the address is not published (posted) on the shared address book but listed only on the personal address book. Either the "publication (shared address book)" button or the "non-publication (personal address book)" button must be designated.

If the user registering the address thinks that the address may be moved to the save folder if the address satisfies the save conditions, he/she presses the "save" button. Then, the save flag is set to "1". If the user registering the address thinks that the address should not be moved to the save folder even if the address satisfies the save conditions, he/she presses the "not save" button. Then, the save flag is set to "0". If the save flag is set to "1", the address is moved to the save folder if the save conditions are satisfied, and if the save flag is set to "0", the address is not moved to the save folder even if the save conditions are satisfied. Either the "save" button or the "not save" button must be designated.

The address input in this manner is stored in the address registration table shown in FIG. 4.

—Image Data Transmission Operation and Address Auto-Restore Operation—

Figure 13:
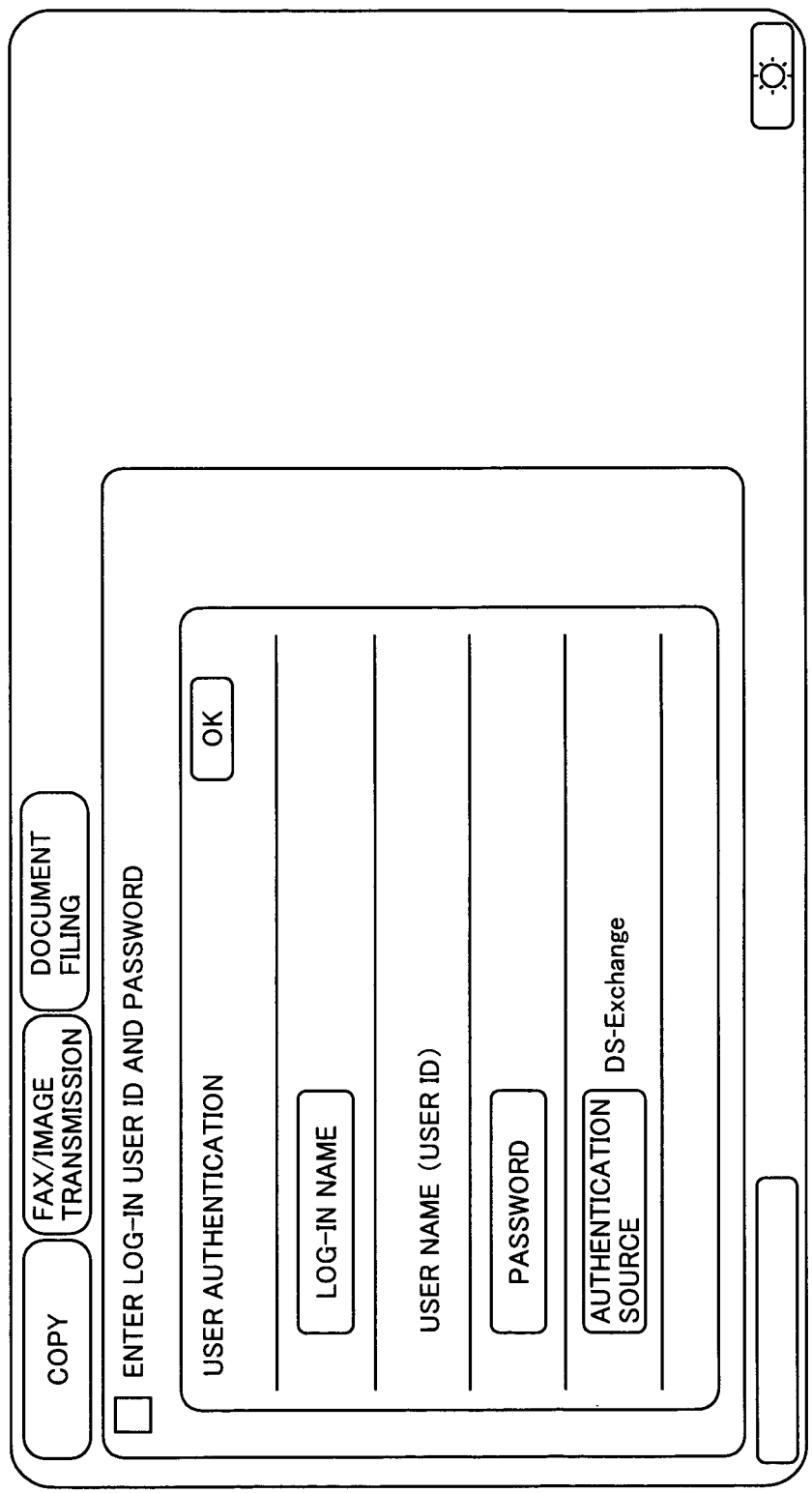
FIG. 13 shows a log-in dialog displayed on a display panel 172 shown in FIG. 3.

When a user wishes to transmit image data, he/she logs in to image forming apparatus 150 having the log-in image shown in FIG. 13 displayed on display panel 172. Here, the user inputs the log-in name (user ID) and the password, as the items displayed on the log-in image shown in FIG. 13. If these input items are registered in the authentication source, image forming apparatus 150 permits log-in of the user, and the logged-in user ID is stored. The user ID is kept displayed on display panel 172 of image forming apparatus 150 while the user is logged-in.

Assume that the logged-in user transmits image data. The user presses the "fax/image transmission" tab button displayed at the uppermost portion of display panel 172. Then, the program having the control structure shown in FIG. 6 is activated.

The address registration table (FIG. 4) and the address use management table (FIG. 5) are read (S1040), and based on the read tables, a page requested by the user of an address book designated by the user (either the shared address book or the personal address book) is displayed (S1050). By way of example, a dialog such as shown in FIG. 14 is displayed on display panel 172.

Figure 14:
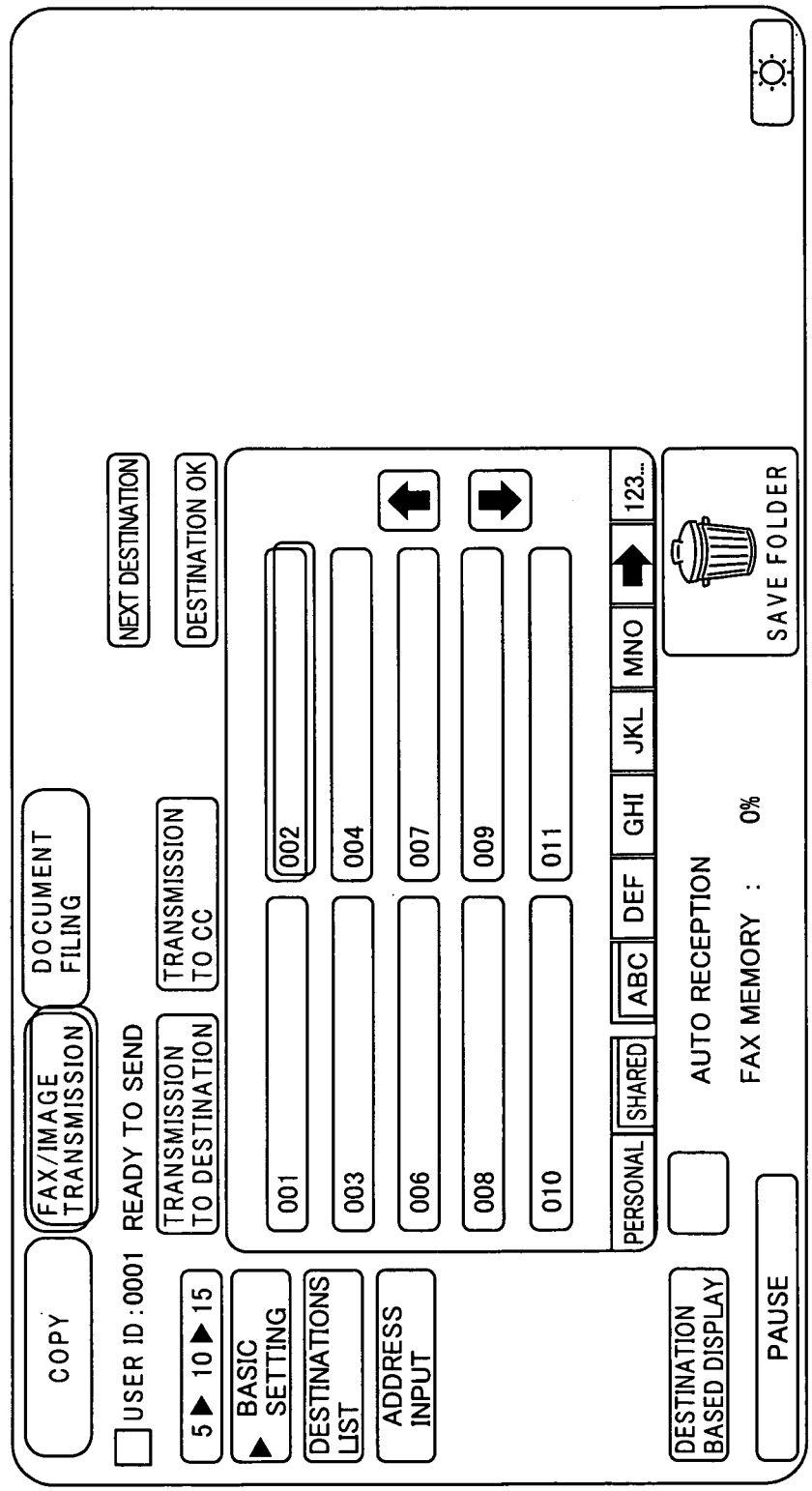
FIG. 14 shows a destination designation dialog (normal address list) displayed on a display panel 172 shown in FIG. 3.
Figure 15:
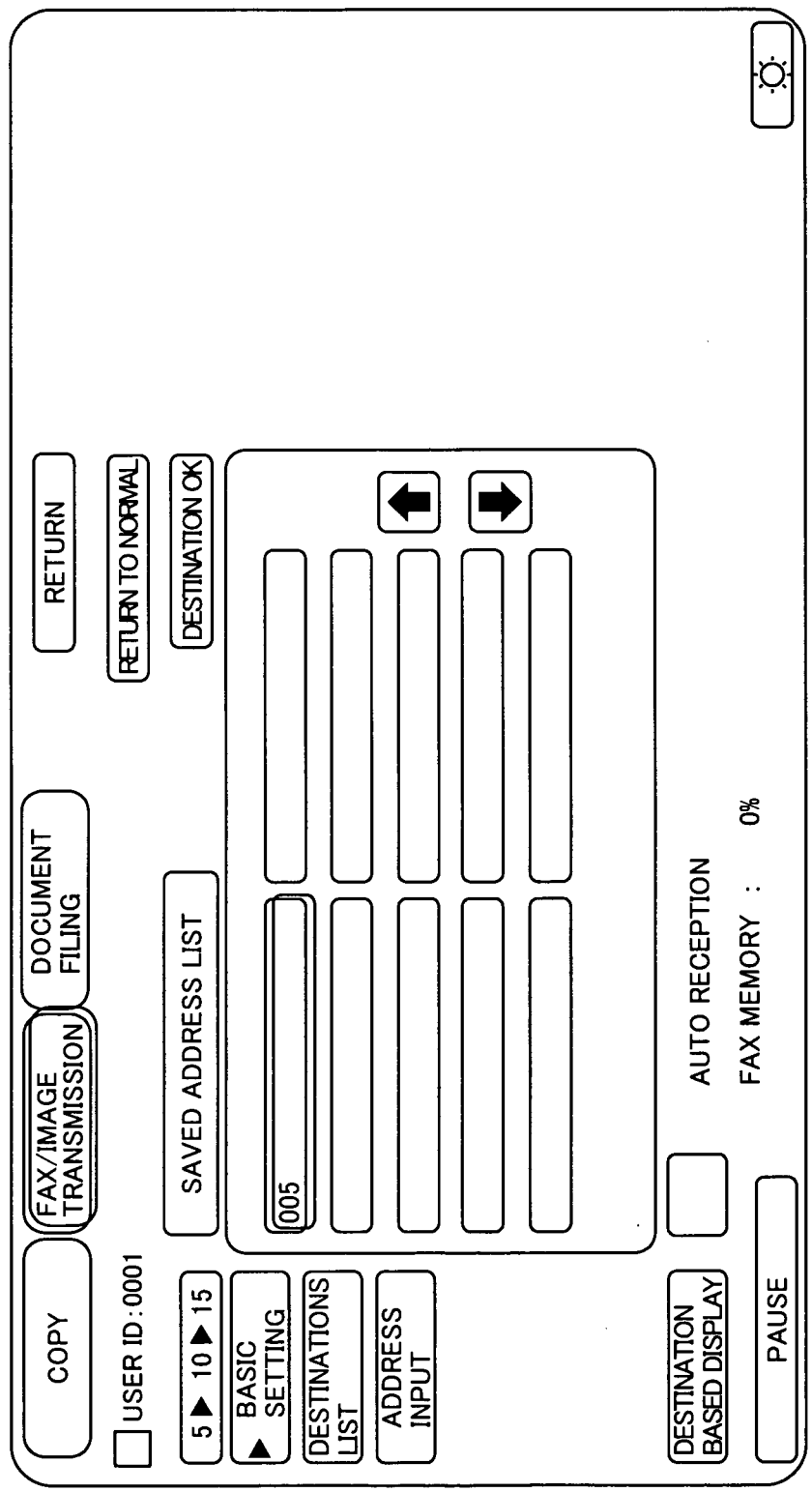
FIG. 15 shows a destination designation dialog (saved address list) displayed on a display panel 172 shown in FIG. 3.

In the dialog shown in FIG. 14, addresses starting with "A", "B" or "C" in the normal folder of the shared address book are shown, in ascending order of the registration number. On the lower right portion of the image, the "save folder" button is displayed. In the present embodiment, a combination of characters and a trash-box icon is displayed on the "save folder" button. When the "save folder" button is pressed, an address in the save folder of shared address book is displayed as shown in FIG. 15. As can be seen from FIGS. 14 and 15, an address "005" of the shared address book has been moved to the save folder (according to the address use management table of FIG. 5, it was moved to the save folder on Jul. 31, 2009).

In the dialog shown in FIG. 14, on the left side of "ABC" button, a tab button to designate either the shared address book or the personal address book to be displayed, is displayed. If the personal address book is designated by this tab button, addresses starting with "A", "B" or "C" in the normal folder of personal address book are displayed in the ascending order of registration number, together with the "save folder" button (button for moving to the save folder of the personal address book).

Assume that the logged-in user designates an address having the registration number "005" stored in the save folder of shared address book shown in FIG. 15, as the destination of fax/image transmission. Here, when the "005" button displayed on display panel 172 is pressed, the address "005" is set to the designated state (the designated state is represented by a double frame). When the "destination OK" button is pressed, the address "005" is designated as the destination of fax/image transmission (YES at S1060). For simplicity of description, it is assumed that this designation of address "005" that has been moved to the save folder of shared address book is the fifth designation by different users.

If the logged-in user designates an address "002" displayed in the normal folder of shared address book shown in FIG. 14 as the destination of fax/image transmission, the operation is as follows. Specifically, the user presses the "002" button displayed on display panel 172. Then, the address "002" is set to the designated state as shown in FIG. 14. When the user further presses the "destination OK" button, the address "002" is designated as the destination of fax/image transmission (YES at S1060).

The date and time of use and the used user ID of the address (here, address "005") designated by the user as the destination of fax/image transmission are written to the address use management table (FIG. 5) (S1070). At this time, in the use history of address "005", that the address has been designated by five different users after it was moved to the save folder (after the date of movement to the save folder) is stored. By way of example, date and time and the user stored as the use history include: (1) used on Aug. 21, 2009, 09:45:30 (current data and time), by a user having user ID 0001 (currently logged-in user); (2) used on Aug. 17, 2009, 16:02:13, by a user having user ID 0021; (3) used on Aug. 16, 2009, 13:37:27, by a user having user ID 0031; (4) used on Aug. 13, 2009, 09:52:55, by a user having user ID 0041; and (5) used on Aug. 4, 2009, 11:25:22, by a user having user ID 0051. The date and time of use (6) represents the date and time (for example, Jun. 30, 2009) when the address was designated as the destination of fax/image transmission in the normal folder more than one month before Jul. 31, 2009, when the address was moved to the save folder (since the auto-save conditions are set to one month, the address was not designated in the normal folder in July).

Figure 16:
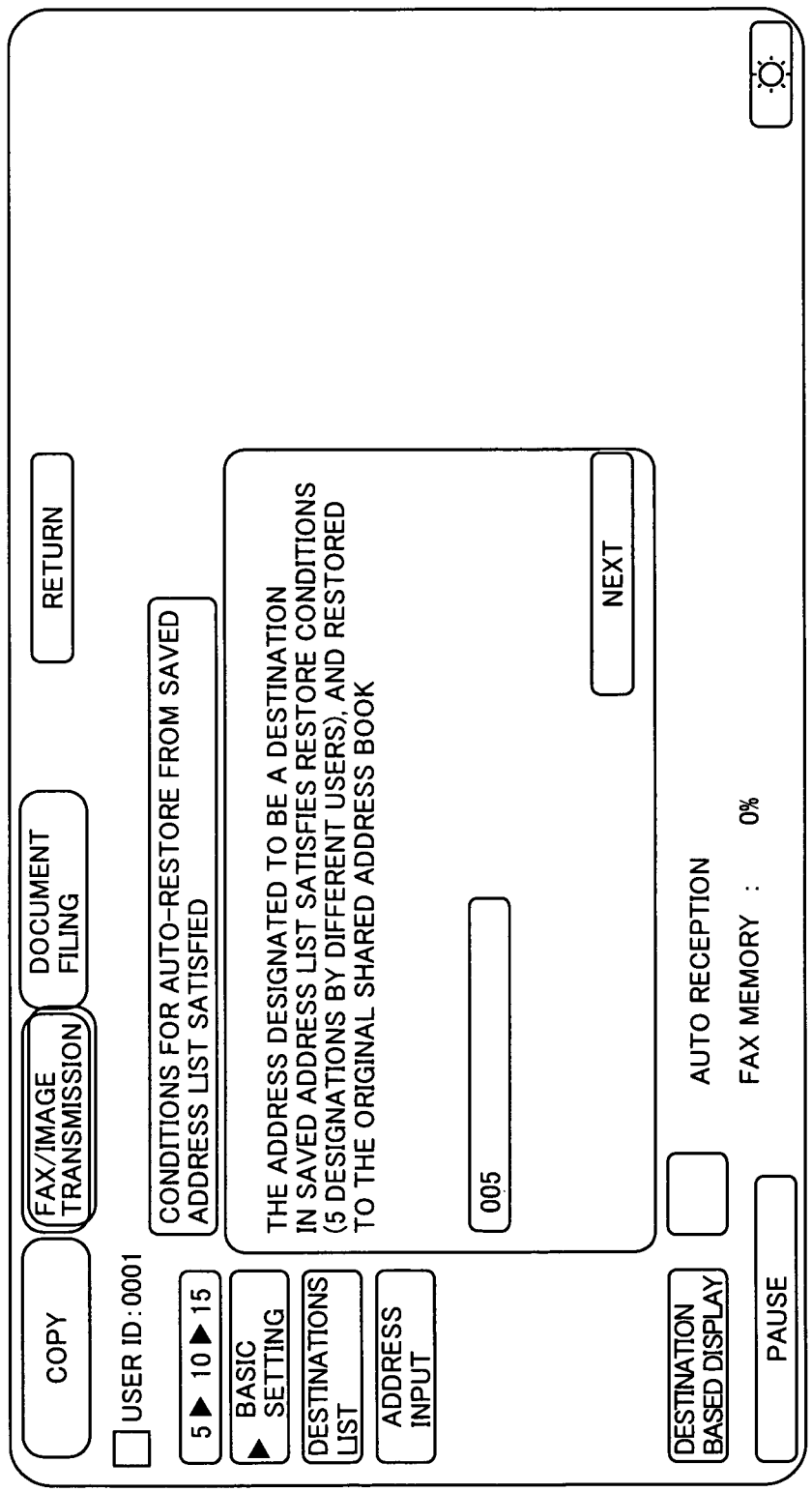
FIGS. 16 to 18 show auto-restore confirming dialogs displayed on a display panel 172 shown in FIG. 3.
Figure 20:
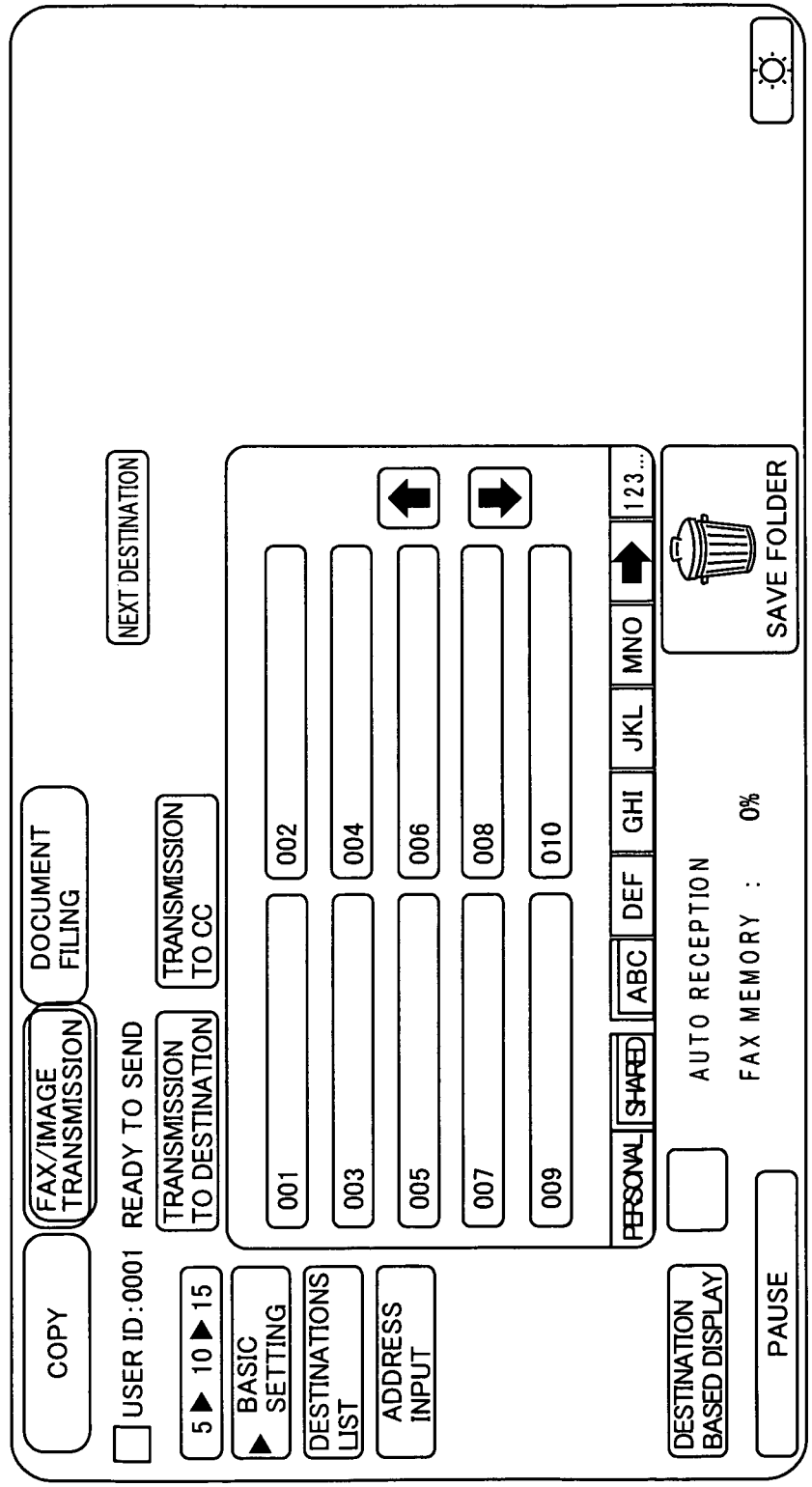
FIG. 20 shows a destination designation dialog (normal address list) with an address restored, displayed on a display panel 172 shown in FIG. 3.

In such a case, the address in the save folder is designated as the destination of fax/image transmission (YES at S1200), and the auto-restore conditions are satisfied (YES at S1220). The auto-restore confirmation dialog shown in FIG. 16 is displayed on display panel 172 (S1230). As shown in FIG. 16, the address "005" is displayed together with a message "THE ADDRESS DESIGNATED TO BE A DESTINATION IN SAVED ADDRESS LIST SATISFIES RESTORE CONDITIONS (5 DESIGNATIONS BY DIFFERENT USERS), AND RESTORED TO THE ORIGINAL SHARED ADDRESS BOOK," and "NEXT" button is displayed. When the logged-in user presses the "NEXT" button, the indication "saved" of the field representing the present state of the corresponding address "005" is changed to "normal" in the address use management table (FIG. 5) (step S1240). Thus, the address "005" comes to be displayed in the normal folder of shared address book, as shown in FIG. 20, which will be described later.

Thereafter, the image data transmission process is carried out, and desired image data is transmitted to the address "005" (S1090).

Figure 17:
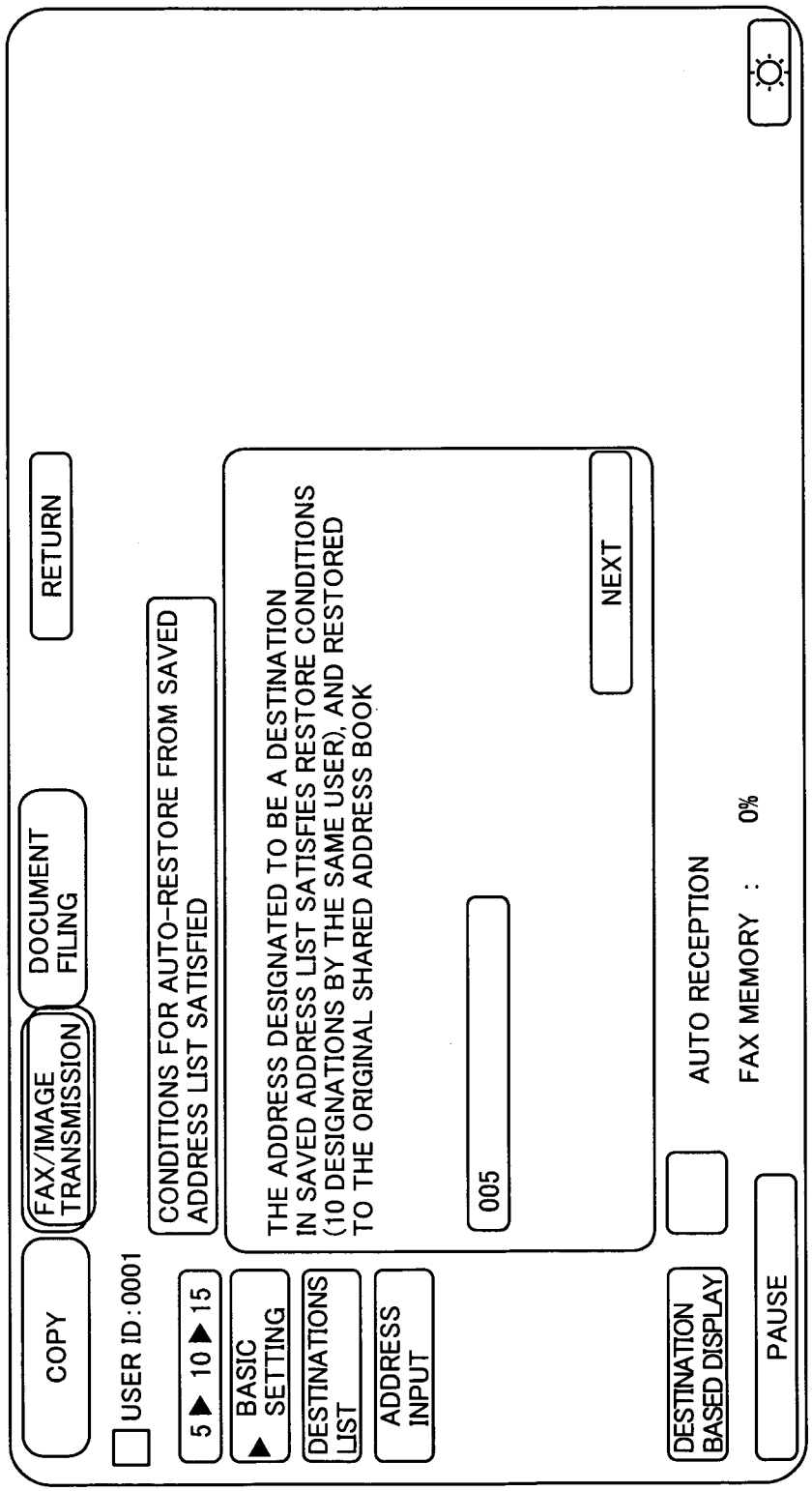

If an address in the save folder is designated as a destination of fax/image transmission (YES at S1200), and different auto-restore conditions are satisfied (YES at S1220), the auto-restore confirmation dialog shown in FIG. 17 is displayed on display panel 172 (S1230). As shown in FIG. 17, the address "005" is displayed together with a message "THE ADDRESS DESIGNATED TO BE A DESTINATION IN SAVED ADDRESS LIST SATISFIES RESTORE CONDITIONS (10 DESIGNATIONS BY THE SAME USER), AND RESTORED TO THE ORIGINAL SHARED ADDRESS BOOK," and "NEXT" button is displayed. When the logged-in user presses the "NEXT" button, the indication "saved" of the field representing the present state of the corresponding address "005" is changed to "normal" in the address use management table (FIG. 5) (step S1240). Thus, the address "005" comes to be displayed in the normal folder of shared address book, as shown in FIG. 20, which will be described later.

Figure 18:
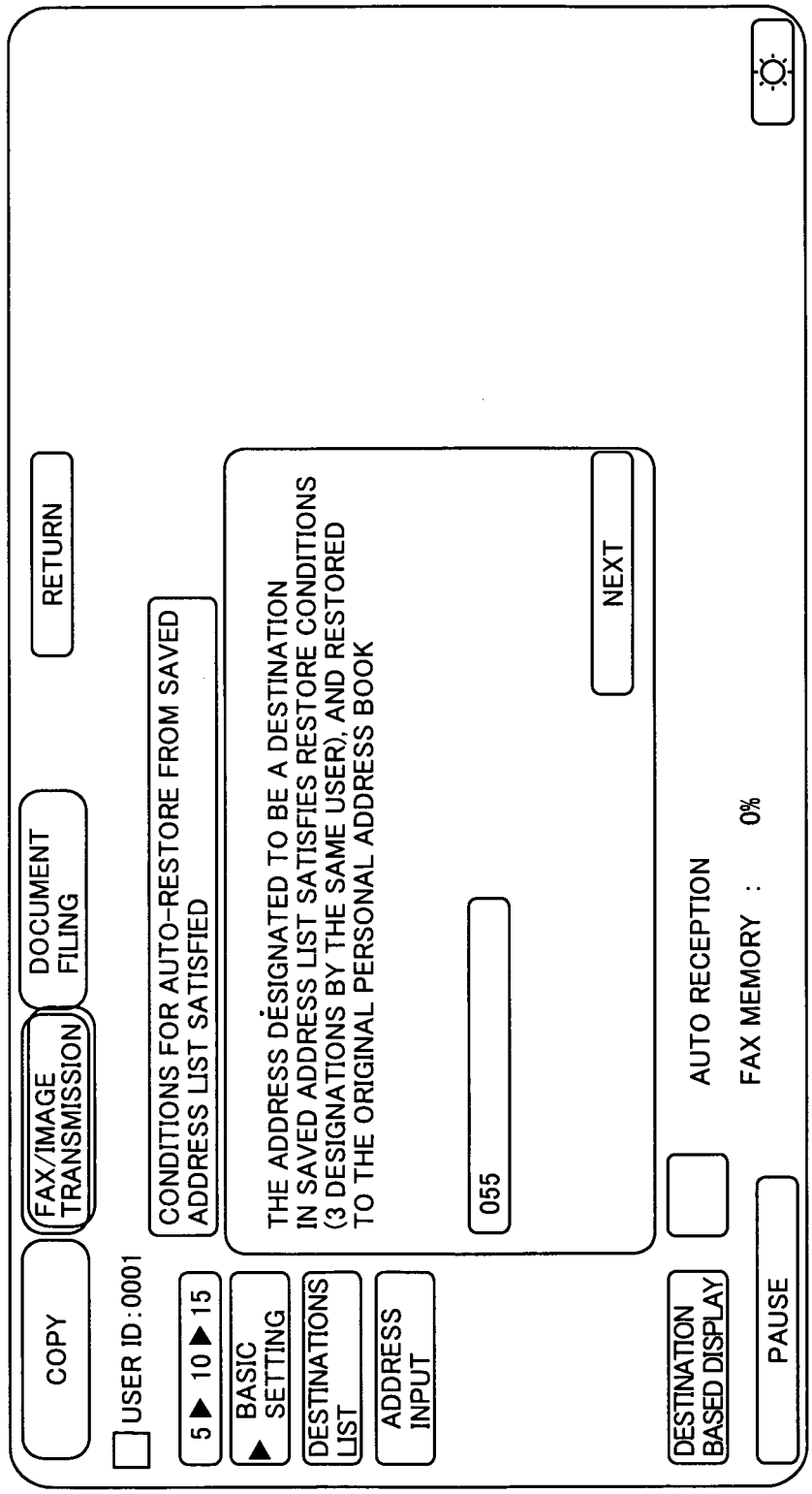

If an address in the save folder of a personal address book is designated as a destination of fax/image transmission (YES at S1200) and the auto-restore conditions set for the personal address book are satisfied (YES at S1220), an auto-restore confirmation dialog shown in FIG. 18 is displayed on display panel 172 (S1230). As shown in FIG. 18, the address "055" is displayed together with a message "THE ADDRESS DESIGNATED TO BE A DESTINATION IN SAVED ADDRESS LIST SATISFIES RESTORE CONDITIONS (3 DESIGNATIONS BY THE SAME USER), AND RESTORED TO THE ORIGINAL PERSONAL ADDRESS BOOK," and "NEXT" button is displayed. When the logged-in user presses the "NEXT" button, the indication "saved" of the field representing the present state of the corresponding address "055" is changed to "normal" in the address use management table (FIG. 5) (step S1240). Thus, the address "055" comes to be displayed in the normal folder of personal address book.

—Address Auto-Save Operation—

When 24 hours pass from the last auto-save operation, the auto-save program having the control structure shown in FIG. 7 is activated. The address use management table is read (S1110), and any address not used for one month or more from the latest date and time of use (date and time (1) of use history (1)) is extracted from the addresses having "normal" stored in the field indicating the present state of the address (S1120).

If there is an extracted address (YES at S1130) and the save flag of the extracted address is set to "1", it is determined that the address may be moved to the save folder (YES at S1140).

In the address use management table (FIG. 5), the indication "normal" of the field representing the present state of the corresponding address is changed to "saved" (S1150).

Accordingly, thereafter, the address not used for more than one month from the latest date and time of use (not designated as the destination of fax/image transmission) comes to be displayed in the save folder (saved address list).

—Address Manual Restore Operation—

Assume that addresses starting with "A", "B" or "C" are displayed in the normal folder of the shared address book, in ascending order of the registration number, as shown in FIG. 14. When the "save folder" button displayed on the lower right portion of the image is pressed, the manual restore program having the control structure shown in FIG. 9 is activated, and the address in the save folder of shared address book is displayed as shown in FIG. 15 (S1310). As shown in FIGS. 14 and 15, the address "005" of the shared address book has been moved to the save folder (according to the address use management table of FIG. 5, it was moved to the save folder on Jul. 31, 2009) and, therefore, it is displayed in the saved address list.

Figure 19:
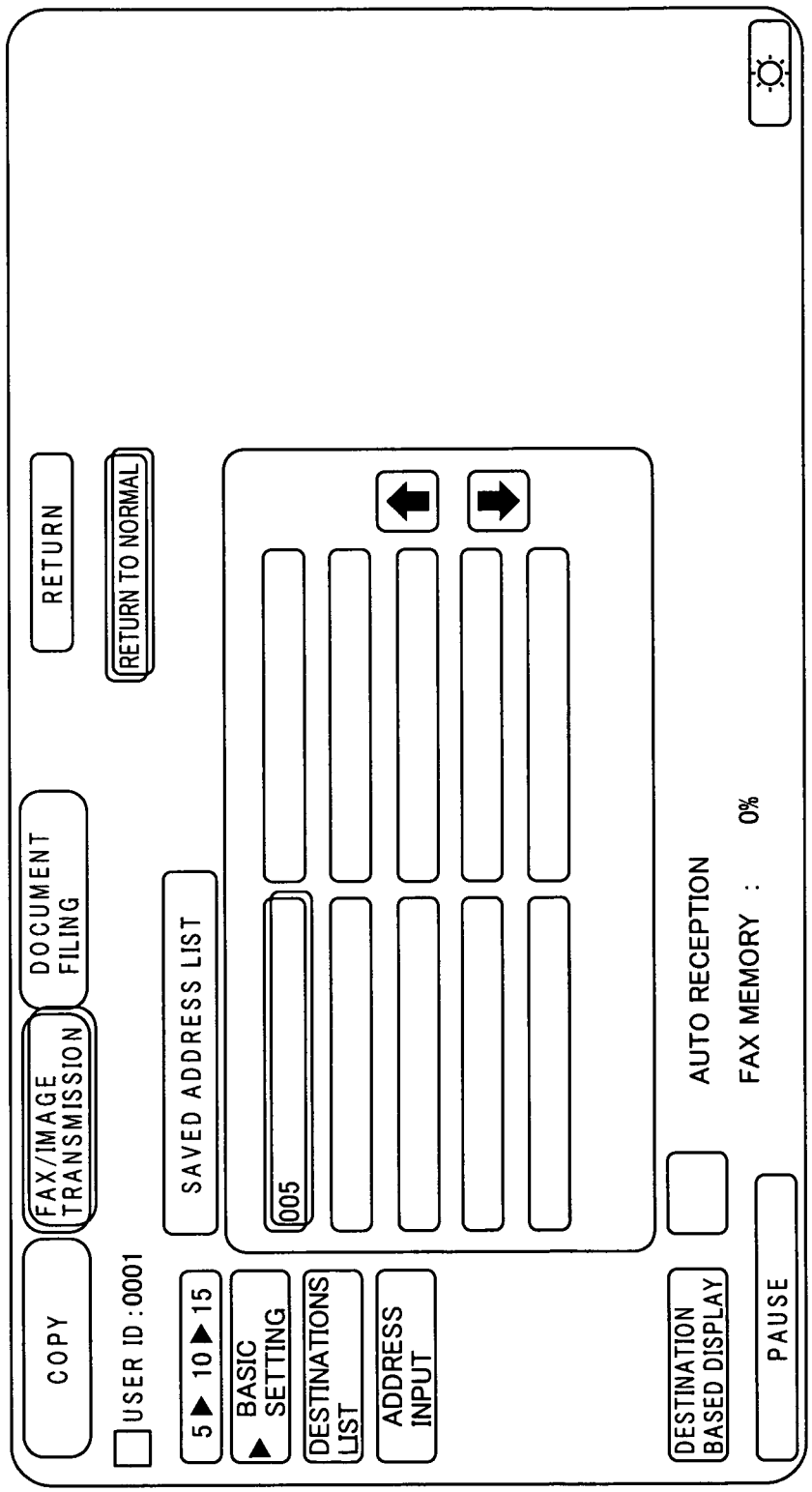
FIG. 19 shows a manual restore dialog displayed on a display panel 172 shown in FIG. 3.

As shown in FIG. 15, if the address "005" button that is to be returned from the save folder to the normal folder is pressed and the "return to normal" button is pressed as shown in FIG. 19, it is determined that the address "005" is designated as an address to be returned from the save folder to the normal folder (S1320).

A message asking an input of whether the address "005" is to be returned from the save folder to the normal folder is displayed (S1330). If the logged-in user presses "YES" of "YES/NO" button in response to the message, it is determined that a request for manually restoring the address in the save folder to the normal folder is detected (YES at S1340).

In the address use management table (FIG. 5), indication "saved" of the field representing the present state of the corresponding address "005" is changed to "normal." Thus, the address "005" comes to be displayed in the normal folder of shared address book, as shown in FIG. 20. When the normal folder of shared address book shown in FIG. 14 is compared with the normal folder of shared address book shown in FIG. 20, it can be seen that in the shared address book, the address "005" is restored from the save folder to the normal folder.

—Address Deletion Operation—

When one month passes from the last deletion operation, the deletion program having the control structure shown in FIG. 10 is activated. When the deletion program is executed, the address use management table is read (S1410). Any address which is not used for one year from the latest date and time of use (date and time of use (1) of use history (1)), among the addresses having "normal" stored in the field representing the present state of the corresponding address, is extracted (S1420). Here, it is assumed that the address "099" is extracted.

As described above, if the logged-in user is an administrator, the logged-in user is authorized to delete every registered address of all address books. A logged-in user who is not an administrator is authorized to delete an address registered by himself/herself. Here, it is assumed that the user (for example, administrator) who logged-in is authorized to delete the extracted address.

Since there is an extracted address (YES at S1430) and the user authorized to delete the extracted address is logged-in, it is determined that deletion is authorized (YES at S1440).

Figure 21:
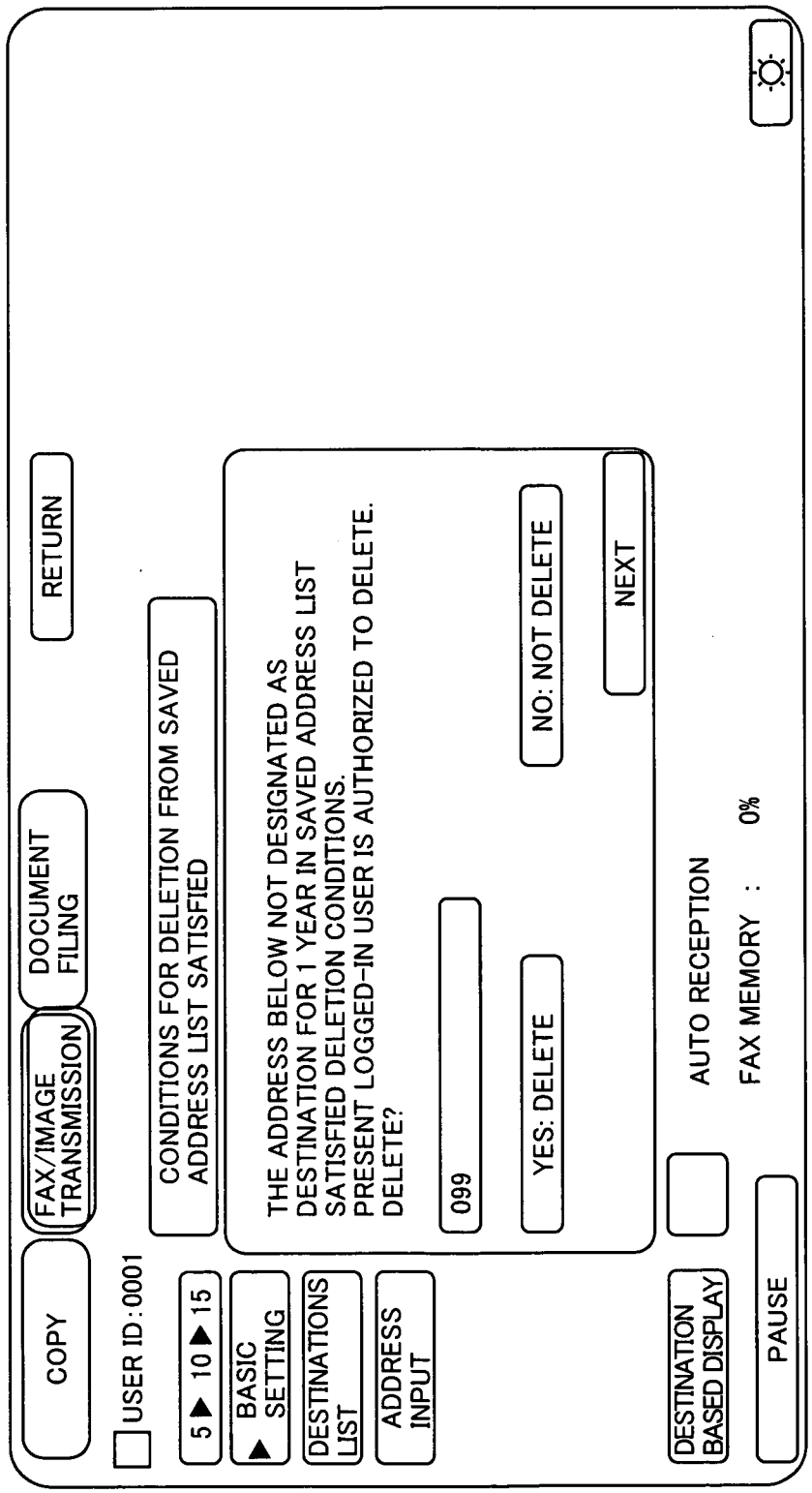
FIG. 21 shows a deletion dialog displayed on a display panel 172 shown in FIG. 3.

In order to confirm deletion of an address that was not used for one year after moved to the save folder, a deletion confirmation dialog shown in FIG. 21 is displayed on display panel 172 (S1450). As shown in FIG. 21, the address to be deleted "099" is displayed together with the message "THE ADDRESS BELOW NOT DESIGNATED AS DESTINATION FOR 1 YEAR IN SAVED ADDRESS LIST SATISFIED DELETION CONDITIONS. PRESENT LOGGED-IN USER IS AUTHORIZED TO DELETE. DELETE?" and "YES: DELETE" and "NO: NOT DELETE" buttons are displayed. If the logged-in user presses "YES: DELETE" button (YES at S1460), the information of address "099" is deleted in the address registration table (FIG. 4) (S1470). Thus, the address "099" is deleted from the storage device (hard disk 302 or RAM 308) of image forming apparatus 150.

As described above, in the image forming apparatus in accordance with the present embodiment, (1) at the time of image transmission, a destination of transmitting image data is designated using an address book registered in advance; (2) even an address registered in the address book is automatically moved to the save folder if the frequency of use is low; (3) if the address moved to the save folder is designated as a destination or restore thereof is requested by the user, it is restored to the original address book; and (4) if deletion conditions are satisfied, the address that has been moved to the save folder is deleted from the address book. As described above, in the image forming apparatus in accordance with the present embodiment, the address book is managed such that the image transmission destination can be appropriately designated by the user. As a result, by using the address book, the transmission destination of the image data can readily be designated by speed dial or abbreviated dial.

Second Embodiment

In the following, an image forming apparatus in accordance with a second embodiment of the present invention will be described. In the image forming apparatus in accordance with the present embodiment, a save folder display program is used in place of the manual restore program of the first embodiment. The saved folder display program displays, when an address or addresses that have been moved to the saved folder are displayed, the saved address list on display panel 172 in a manner allowing the user to easily designate a destination address or a manual restore address, from the save folder. The structure of image forming apparatus in accordance with the present embodiment is different from the first embodiment only in that the save folder display program, which will be described below, is used in place of the manual restore program, in the program structures executed by CPU 300.

[Software Configuration]

Figure 22:
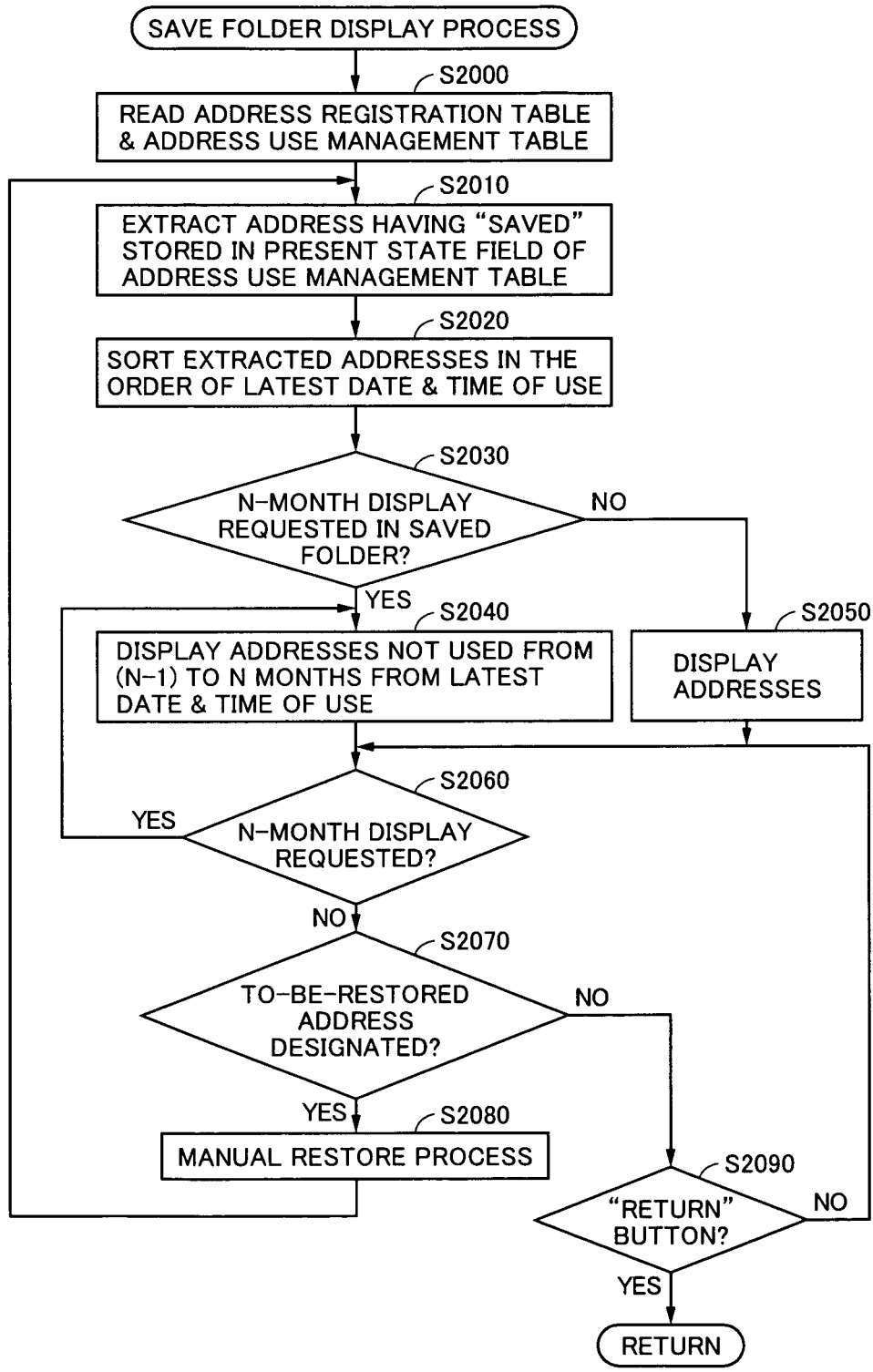
FIG. 22 is a flowchart representing a save folder display program executed by an image forming apparatus in accordance with a second embodiment of the present invention.

Similar to the manual restore program of the first embodiment, the save folder display program having the control structure shown in FIG. 22 is activated when the "save folder" button displayed on display panel 172 together with addresses on the destination designating dialog of FIG. 14 is pressed.

Referring to FIG. 22, at S2000, CPU 300 reads the address registration table (FIG. 4) and the address use management table (FIG. 5).

At S2010, CPU 300 extracts any address having "saved" stored in the field representing the present state of the address in the address use management table.

Figure 23:
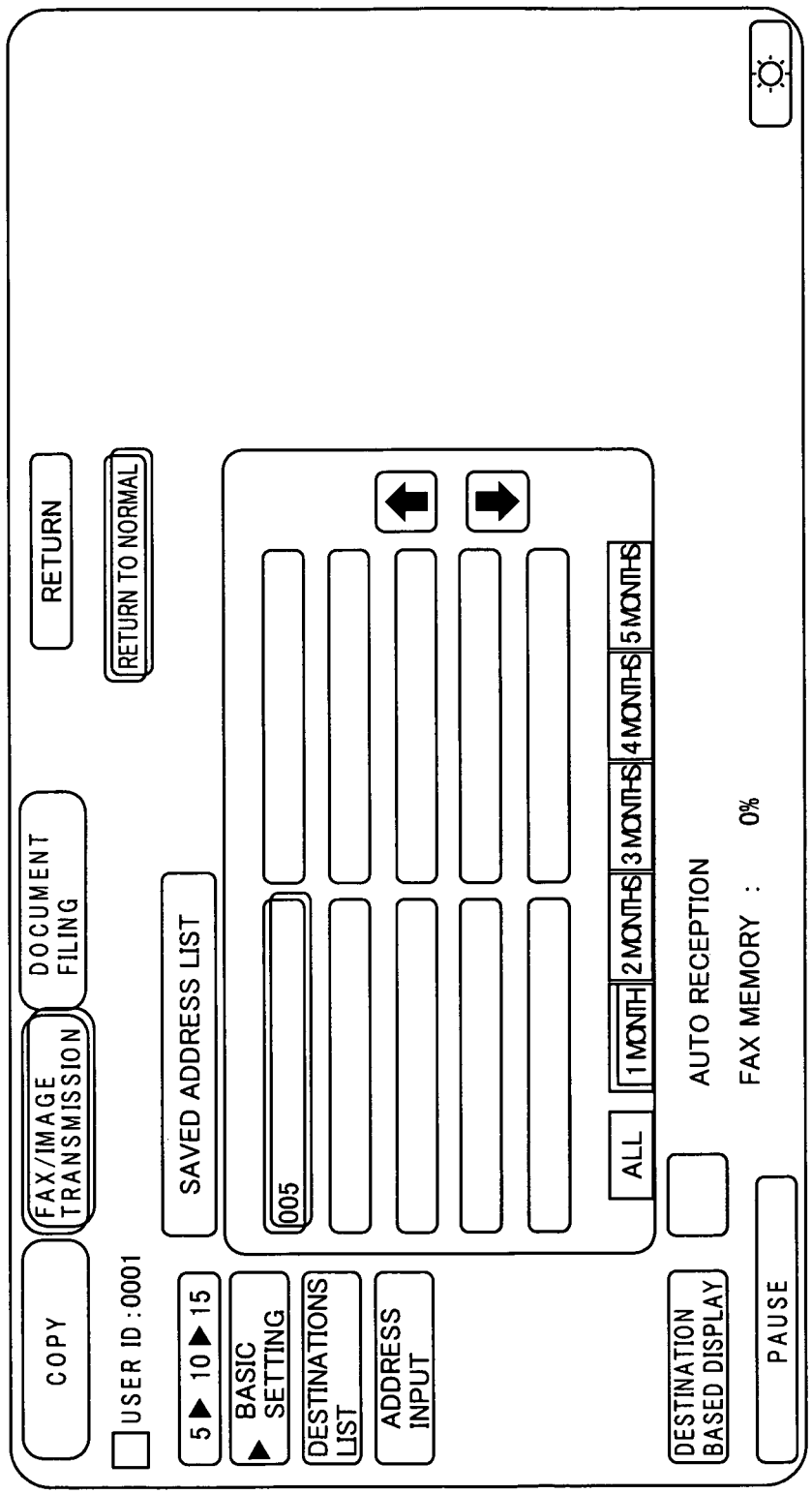
FIG. 23 shows a saved address image displayed on display panel 172 shown in FIG. 3, when the program of FIG. 22 is executed.

At S2020, CPU 300 sorts the extracted addresses in the order of latest date and time of use. At this time, based on the date and time data stored as the date and time of use (1) of use history (1) of each address, CPU 300 sorts the addresses in the order of latest date and time of use. The sorted address are displayed on a save folder display image such as shown in FIG. 23 at S2025.

At S2030, CPU 300 determines whether or not a request for displaying any address not used for N months (N is an arbitrary natural number not larger than 12. Here, for simplicity of description, N is assumed to be a natural number not larger than 5. N may be designated by a user, as will be described later) on the save folder display is detected. If it is determined that a request for displaying any address not used for N months is detected (YES at S2030), the process proceeds to S2040. In the following, a button generating this request will be referred to as "N-months button" and the request will be referred to as "N-months display request." Otherwise (NO at S2030), the control proceeds to S2050. It is NO at S2030 if the N-months display request is not designated on the save folder in a prescribed time period.

At S2040, CPU 300 displays an address or addresses not used for N months. Here, based on the addresses sorted in the order of latest date and time of use, CPU 300 extracts and displays any address not used for the designated N months. Thereafter, the control proceeds to S2060.

If the determination at S2030 is negative, at S2050, all addresses extracted at S2020 are displayed on the save folder display image. Thereafter, the control proceeds to S2060.

At S2060, the control waits for a user input, and determines whether or not the N-months button is pressed. If the determination is positive, the flow returns to S2040, and display is given in accordance with a newly designated N. If the determination is negative, the control proceeds to S2070.

At S2070, whether or not the "return to normal" button is pressed designating any of the displayed addresses is determined. If the determination is positive, the control proceeds to S2080. Otherwise, the control proceeds to S2090.

At S2080, a process similar to the manual restore program shown in FIG. 9 is carried out. Though not shown in FIG. 22, S2080 includes S1330 to S1350 of FIG. 9. After S1350, the control returns to S2010.

At S2090, whether or not the "return" button is pressed is determined. If the determination is positive, execution of the program ends, and the control returns to the program from which the present program was called. If the determination is negative, the control returns to S2060.

[Operation]

The saved address display operation of the image forming apparatus of the present embodiment in accordance with the structure and flowchart above will be described.

It is assumed that, as shown in FIG. 14, addresses starting with "A", "B" or "C" in the normal folder of the shared address book are displayed, in ascending order of the registration number. If the "save folder" button on the lower right portion of the image is pressed, addresses having "saved" stored in the field indicating the present state of the address in the address use management table are extracted (S2010), and the extracted addresses are sorted in the order of latest date and time of use (S2020).

On FIG. 23 (as can be clearly seen from the comparison with FIG. 19), tab buttons of "1 month," "2 months," "3 months," "4 months," and "5 months" indicating the time period in which an address is not designated as a destination of fax/image transmission are displayed below the saved address list. Further, "all" tab button is also displayed, which corresponds to display of the saved address list of all periods. In the example of FIG. 23, the tab button of "1 month" is pressed, and an address or addresses not designated as a destination of fax/image transmission for the past one month in the saved address list are displayed.

If it is detected that the logged-in user requests a saved address list not designated as a destination of fax/image transmission for the past N months in the save folder (YES at S2030), an address or addresses in the save folder of shared address book and not used for N months are displayed as shown in FIG. 23 (S2040). If such a request is not detected (NO at S2030), the addresses sorted at S2020 are displayed on the save folder display image, in the manner as shown in FIG. 23 (S2050).

In this manner, with the addresses not used for one month among the addressees in the save folder of shared address book displayed on FIG. 23, when the address "005" button to be restored from the save folder to the normal folder is pressed and the "return to normal" button is pressed as shown in FIG. 23 (NO at S2060, YES at S2070), it is determined that the address "005" is designated as the address to be restored from the save folder to the normal folder. Thereafter, process steps similar to the manual restore process of the first embodiment are executed, and the designated address is restored from the save folder to the normal folder. Thereafter, the control returns to S2010, addresses having "saved" stored in the present state field are extracted and sorted (S2010 and S2020). If the N-months display request is detected (YES at S2030), S2040 is executed, and if not, the addresses sorted at S2020 are displayed as they are (S2050). Here, the address restored from the save folder to the normal folder at S2080 is not extracted at S2010 and, therefore, in the updated display, it is not displayed on the save folder display image.

On the other hand, if the tab button of "1 month" is pressed with the save folder display image of FIG. 23 being displayed, the determination at S2060 becomes positive, and addresses narrowed in accordance with the number of months newly designated at S2040 are displayed again.

As described above, in the image forming apparatus in accordance with the present embodiment, addresses that have been moved to the save folder are displayed classified in accordance with the period in which the addresses are not designated as destinations of fax/image transmission on month-by-month basis. This makes it easier for the user to find a desired address in the save folder.

Third Embodiment

The image forming apparatus in accordance with a third embodiment of the present invention will be described. The image forming apparatus in accordance with the present embodiment executes a save folder display program different from that of the second embodiment, in place of the manual restore program of the first embodiment. According to the save folder display program, when an address or addresses that have been moved to the save folder are displayed, the saved address list is displayed on display panel 172 in a manner allowing the logged-in user to easily designate a destination address or an address to be manually restored, from the save folder. The structure of the image forming apparatus in accordance with the present embodiment is the same as that of the second embodiment except that the structure of save folder display program is different from that of the second embodiment described above.

[Software Configuration]

Figure 24:
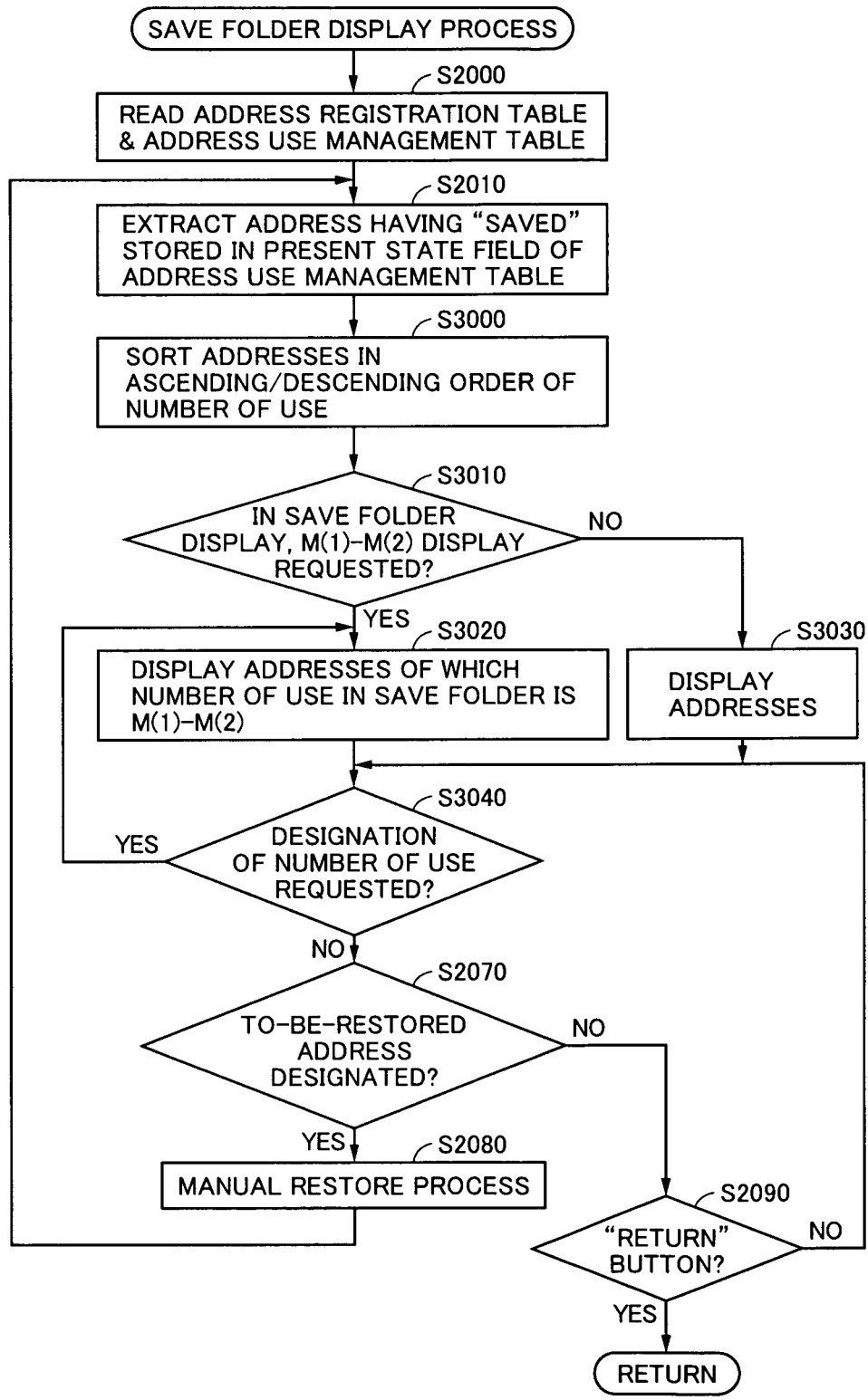
FIG. 24 is a flowchart representing a control structure of a save folder display program executed by an image forming apparatus in accordance with a third embodiment of the present invention.

Referring to FIG. 24, the save folder display program (subroutine program) executed by CPU 300 of the image forming apparatus in accordance with the present embodiment has the following control structure. The processes at S2000 and S2010 are as described above. At S3000, CPU 300 sorts extracted addresses in ascending order or descending order of the number of use (the number of designations as the destination of fax/image transmission) after the addresses were moved to the save folder. Here, CPU 300 sorts the addresses in the order of the number of use, based on the data stored as the use history of each address.

Figure 25:
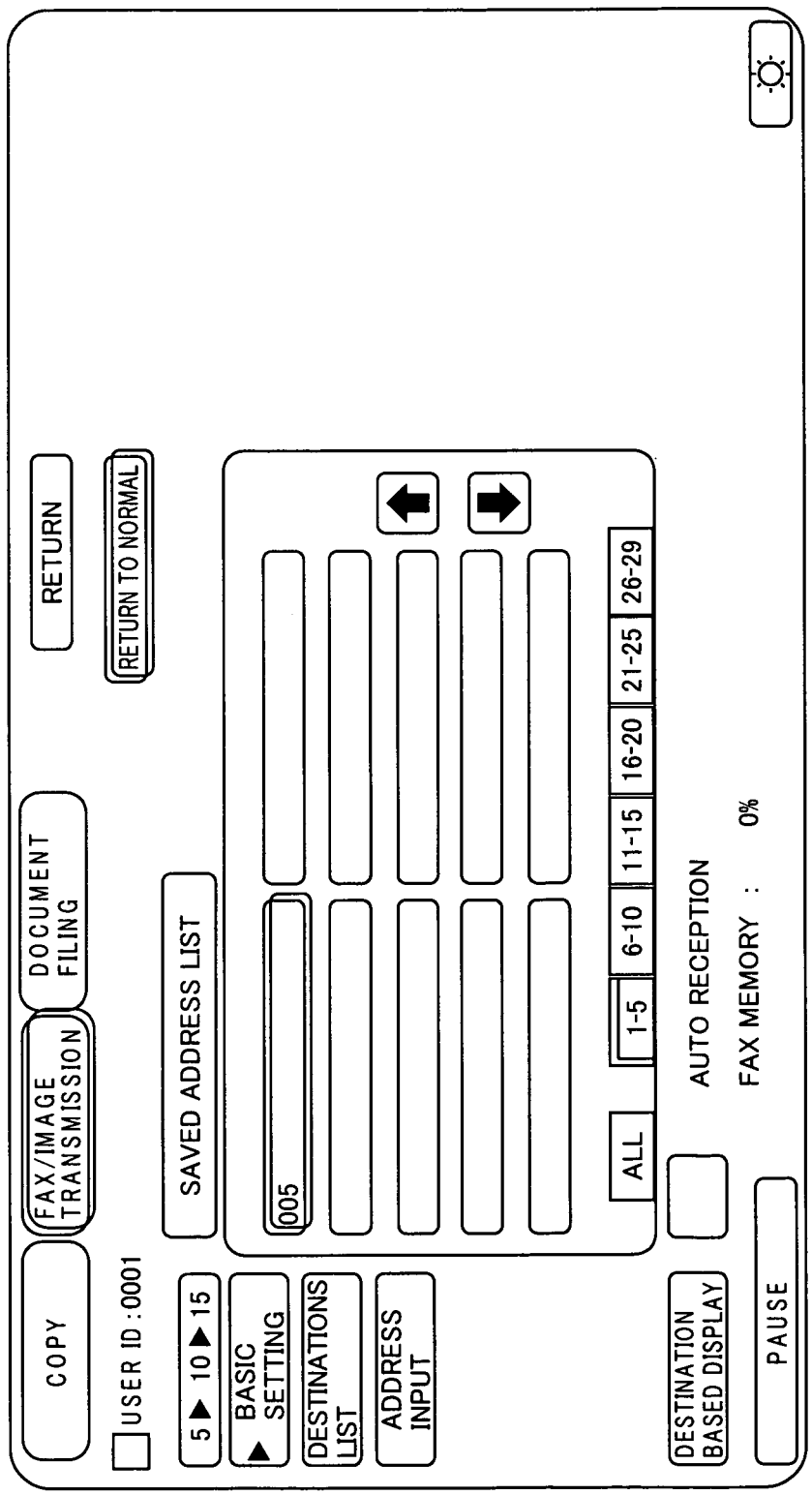
FIG. 25 shows a saved address image displayed on display panel 172 shown in FIG. 3, when the program of FIG. 24 is executed.

At S3010, CPU 300 determines whether or not a request for displaying addresses of which number of use is from M(1) to M(2) (M(1) and M(2) are natural numbers, and M(1)<M(2)) in the save folder has been detected. If it is determined that a request for displaying addresses of which number of use is M(1) to M(2) is detected (YES at S3010), the process proceeds to S3020. Otherwise (NO at S3010), the control proceeds to S3030. It is NO at S3010 if the request of displaying addresses of which number of use is M(1) to M(2) is not designated after power on, or if a request of "display all" was made at the end of the last processing. A plurality of combinations of M(1) and M(2) are prepared in advance, such as (M(1), M(2))=(1,5), (6,10), (11,15), (16,20), (21, 25) and (26, 29). As shown in FIG. 25, on the save folder display image in accordance with the present embodiment, tab buttons corresponding to such combinations and an "all" tab button are displayed. If any of these buttons is pressed, values corresponding to the button are input to M(1) and M(2), and the determination at S3010 becomes YES.

At S3020, CPU 300 displays addresses of which number of use in the save folder is M(1) to M(2). Here, CPU 300 extracts and displays addresses of which number of designations is M(1) to M(2), based on the addresses sorted in the order of the number of use. The display image is as shown in FIG. 25. After S3020, the control proceeds to S3040.

If the determination at S3010 is negative, at S3030, all addresses are displayed using the save folder display image of FIG. 25. Thereafter, the control proceeds to S3040.

At S3040, the control waits for a user input. If any of the tab buttons designating the number of use shown in FIG. 25 is pressed, the determination of S3040 becomes positive, values corresponding to the tab button are input to M(1) and M(2), and the control returns to S3020. If "all" is pressed, "1" may be input to M(1) and the maximum number that can be stored may be input to M(2).

If the determinant at S3040 is negative, the control proceeds to S2070. Steps S2070, S2080 and S2090 shown in FIG. 24 are the same as those shown in FIG. 22, except that the control returns to S3040 if the determination at S2090 is negative.

[Operation]

The saved address display operation of the image forming apparatus of the present embodiment in accordance with the structure and flowchart above will be described.

It is assumed that, as shown in FIG. 14, addresses starting with "A", "B" or "C" in the normal folder of the shared address book are displayed, in ascending order of the registration number. If the "save folder" button on the lower right portion of the image is pressed, addresses having "saved" stored in the field indicating the present state of the address in the address use management table are extracted (S2000-S2010), and the extracted addresses are sorted in the order of the number of use after the addresses were moved to the save folder (S3000).

If it is detected that the logged-in user requests the saved address list of which number of use in the saved folder is from M(1) to M(2) (YES at S3010), addresses in the save folder of the shared address book of which number of use is not smaller than M(1) and not larger than M(2) are displayed as shown in FIG. 25 (S3020).

FIG. 25 shows the save folder display image in accordance with the present embodiment. On FIG. 25 (as can be clearly seen from the comparison with FIG. 19), below the saved address list, tab buttons "1-5", "6-10", "11-15", "16-20", "21-25" and "26-29" representing the number of designations as the destination of fax/image transmission are displayed. Further, "all" tab button is also displayed, which corresponds to display of the list of all saved addresses. In FIG. 25, the tab button "1-5" is pressed, and in the saved address list, an address designated at least once and at most five times as the destination of fax/image transmission is displayed. In the present embodiment, the restore conditions is that the address is designated 30 times without exception (no matter whether by the same user or by different users, and no matter whether it is in the shared address book or a personal address book).

In this state, the control waits for a user input. If the user presses any of the tab buttons designating the number of use, the determination at S3040 becomes positive, and the process of S3020 is executed again. Here, addresses of which number of use is at least M(1) and at most M(2) newly designated at S3040 are displayed.

If the user designates one of the addresses and presses the "return to normal" button, the processes of S2070 and S2080 are executed, and the designated address is returned from the save folder to the normal folder. Thereafter, the control returns to S2010 and the addresses having "saved" stored in the present state field are extracted. This time, the address that has been manually restored to the normal folder at S2080 is not extracted. As a result, the restored address is not displayed either at S3020 or S3030.

If the user presses the "return" button (see FIG. 25), the control passes through S2070 and S2090, and execution of the program ends.

As described above, in the image forming apparatus in accordance with the present embodiment, the address that has been moved to the save folder is displayed classified in accordance with the number of designations as the destination of fax/image transmission. This makes it easier for the user to find a desired address in the save folder. Particularly, an address not yet automatically restored to the normal folder but used frequently as the destination of fax/image transmission from the save folder can easily be restored manually.

Fourth Embodiment

Figure 26:
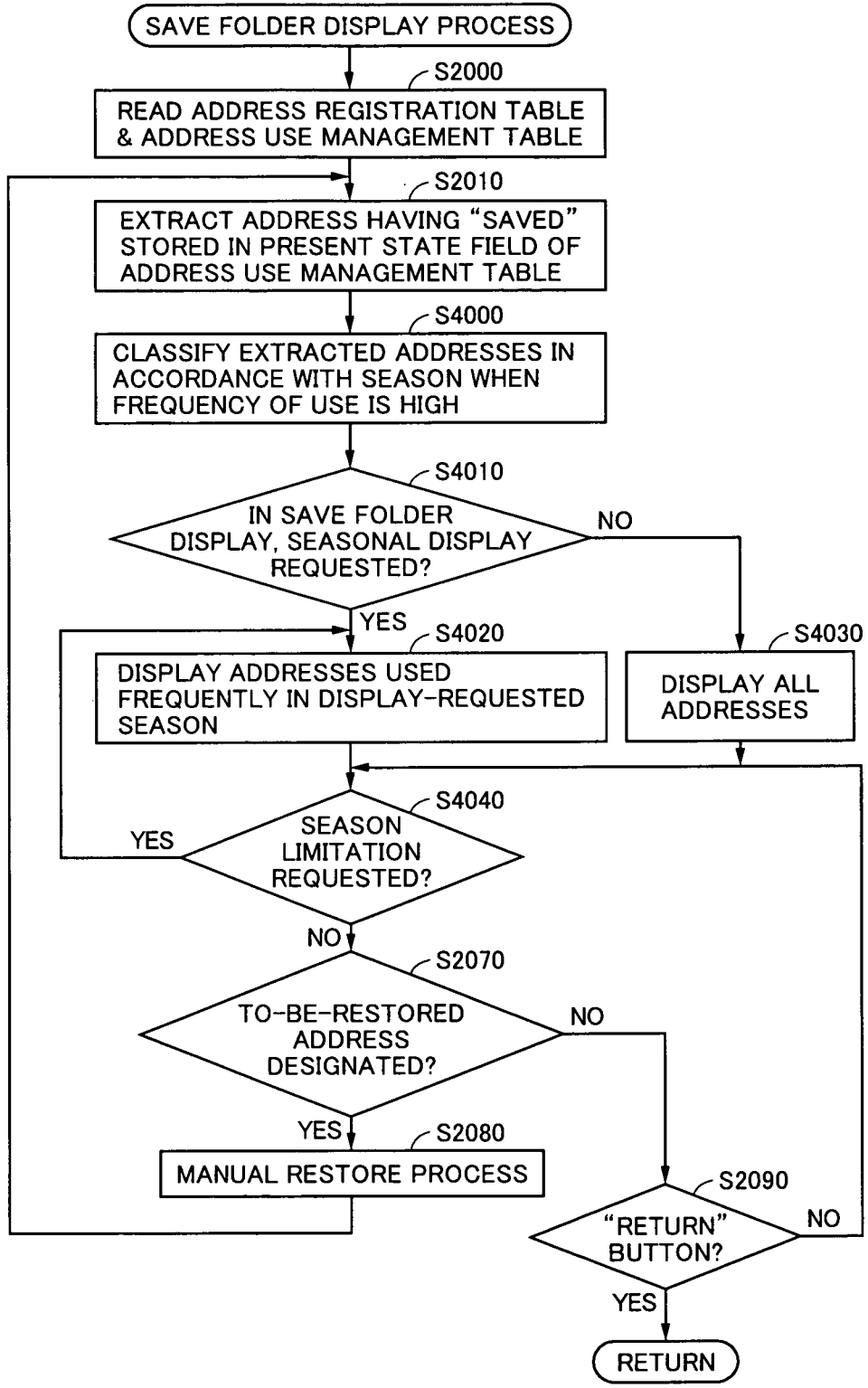
FIG. 26 is a flowchart representing a control structure of a save folder display program executed by an image forming apparatus in accordance with a fourth embodiment of the present invention.

In the following, an image forming apparatus in accordance with a fourth embodiment of the present invention will be described. The image forming apparatus in accordance with the present embodiment is different from the second and third embodiments in that a different program having the control structure shown in FIG. 26 is executed in place of the save folder display programs of the second embodiment shown in FIG. 22 and the third embodiment shown in FIG. 24. In the present embodiment, according to the save folder display program, when an address or addresses that have been moved to the save folder is displayed, the saved address list is displayed on display panel 172 in a manner allowing the logged-in user to easily designate a destination address or an address to be manually restored, from the save folder. The save folder display program is different from the programs of the same name in accordance with the second and third programs. The structure of the image forming apparatus in accordance with the present embodiment is different from the second and third embodiments only in the program structure of the save folder display program.

[Software Configuration]

Referring to FIG. 26, the processes at S2000 and S2010 are the same as those of the programs in accordance with the second and third programs. At S4000, CPU 300 classifies the extracted addresses in accordance with the season when the frequency of use was high. Here, CPU 300 classifies the addresses in accordance with the season when the frequency of use was high based on the data of months (season) in which each address was used frequently before determination of saving each address was made in the address use management table.

At S4010, CPU 300 determines whether or not a request for displaying any address used frequently in a designated season (hereinafter referred to as a seasonal display request) in the save folder display is detected. If it is determined that the seasonal display request is detected (YES at S4010), the process proceeds to S4020. Otherwise (NO at S4020), the control proceeds to S4030. The determination at S4010 is made based on the season last designated after power on. If such designation has never been made, the determination at S4010 is NO.

Figure 27:
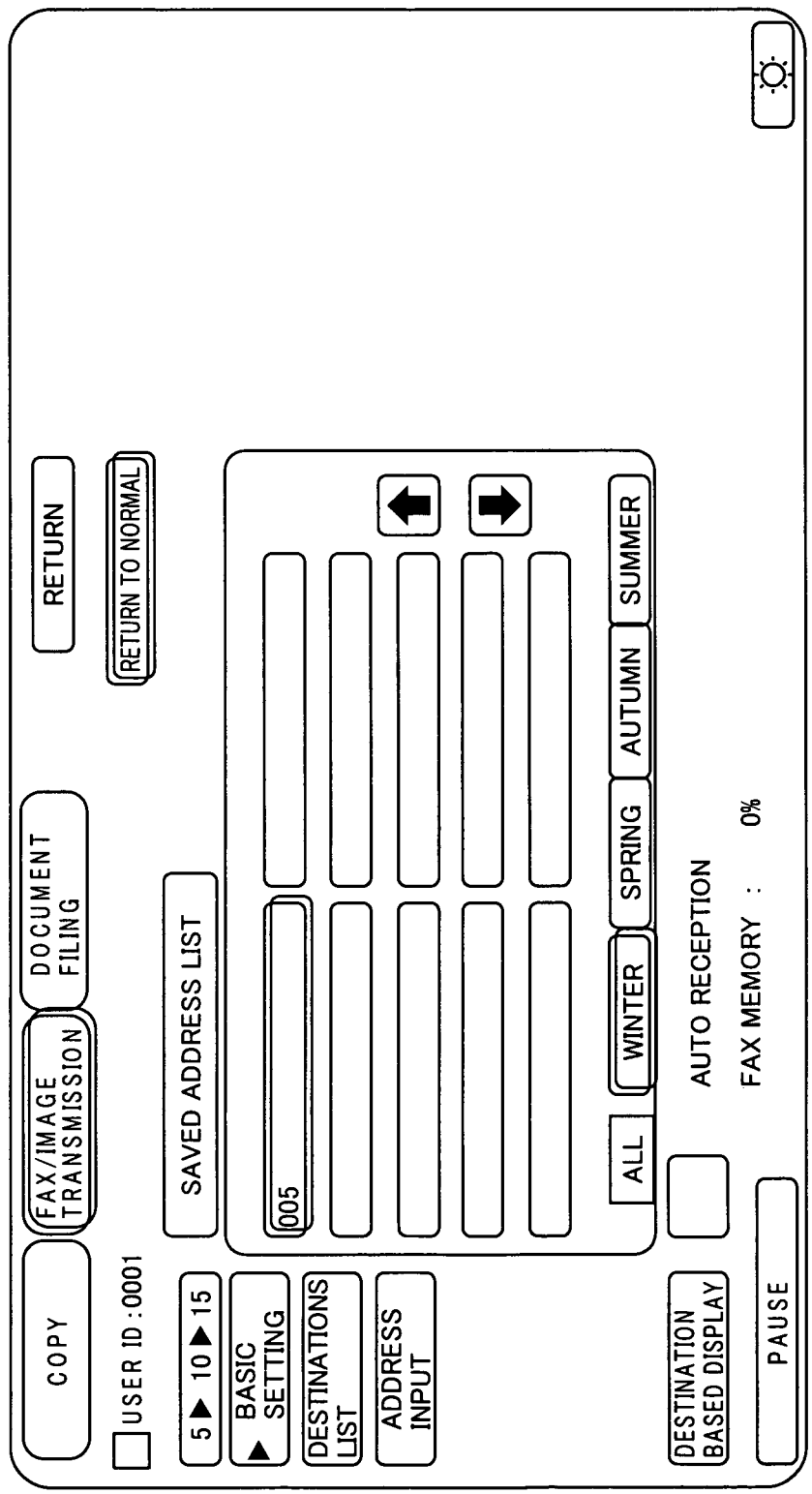
FIGS. 27 and 28 show the saved address image displayed on display panel 172 shown in FIG. 3, when the program of FIG. 26 is executed.

At S4020, CPU 300 displays an address or addresses frequently used in the season of which display is requested (winter (December to February), spring (March to May), summer (June to August) and autumn (September to November)) among the addresses in the save folder. FIG. 27 shows an example of the displayed save folder display image. Thereafter, the control proceeds to S4040.

At S4030, all addresses are displayed on the save folder display image, regardless of the season. Thereafter, the control proceeds to S4040.

At S4040, the control waits for a user input. If the input designates a season, the control returns to S4020. At S4020, an address or addresses frequently used in the newly designated season are displayed. If the determination at S4040 is negative, the control proceeds to S2070.

The process steps S2080 and S2090 following S2070 are the same as those of FIGS. 22 and 24, except that the control returns to S4040 if the result of determination at S2090 is negative.

[Operation]

The saved address display operation of the image forming apparatus of the present embodiment in accordance with the structure and flowchart above will be described.

It is assumed that, as shown in FIG. 14, addresses starting with "A", "B" or "C" in the normal folder of the shared address book are displayed, in ascending order of the registration number. If the "save folder" button on the lower right portion of the image is pressed, addresses having "saved" stored in the field indicating the present state of the address in the address use management table are extracted (S2010), and the extracted addresses are sorted season by season in accordance with the frequency of use (S4000).

If it is detected that a saved address list of the season (winter, spring, summer, autumn) in which the frequency of use was high (YES at S4010) in the save folder is requested, an address or addresses that was used frequently in the requested season but thereafter moved to and held in the save folder at present among the addresses of the shared address book are displayed (S4020).

On FIG. 27 (as can be clearly seen from the comparison with FIG. 19), tab buttons of "winter," "spring," "summer" and "autumn" indicating the season in which an address was frequently designated as a destination of fax/image transmission in the normal folder are displayed below the saved address list. Further, "all" tab button is also displayed, which corresponds to display of the saved address list of all periods. In the example of FIG. 27, the tab button "winter" is pressed and an address frequently designated as a destination of fax/image transmission in winter (December to February) is displayed (for actual example of address display, see FIG. 28).

If no season is designated, all addresses are displayed on the save folder display image, regardless of the season (S4030).

If the user presses any of the buttons designating a season on the save folder display image, an address or addresses frequently used in the newly designated season are displayed at S4020.

If any of the addresses displayed on the save folder display image is designated and the "return to normal" button is pressed, the address is moved from the save folder to the normal folder, as in the manual restore operation of the first embodiment. Thereafter, at S2010, the address is not extracted and, therefore, the address is not displayed in the process of S4020 and S4030.

If "return" button is pressed in the save folder display image, execution of this program ends, and the control returns to the program from which the present program was called.

As described above, in the image forming apparatus in accordance with the present embodiment, addresses moved to the save folder are displayed classified season by season in accordance with the frequency of designation as the destination of fax/image transmission. This makes it easier for the user to find a desired address in the save folder. Particularly, an address not yet automatically restored to the normal folder but used frequently at certain season from the save folder can easily be restored manually. Further, it becomes easier to designate a destination to which image data is repeatedly transmitted at certain season, from the save folder.

<Modification>

Figure 28:
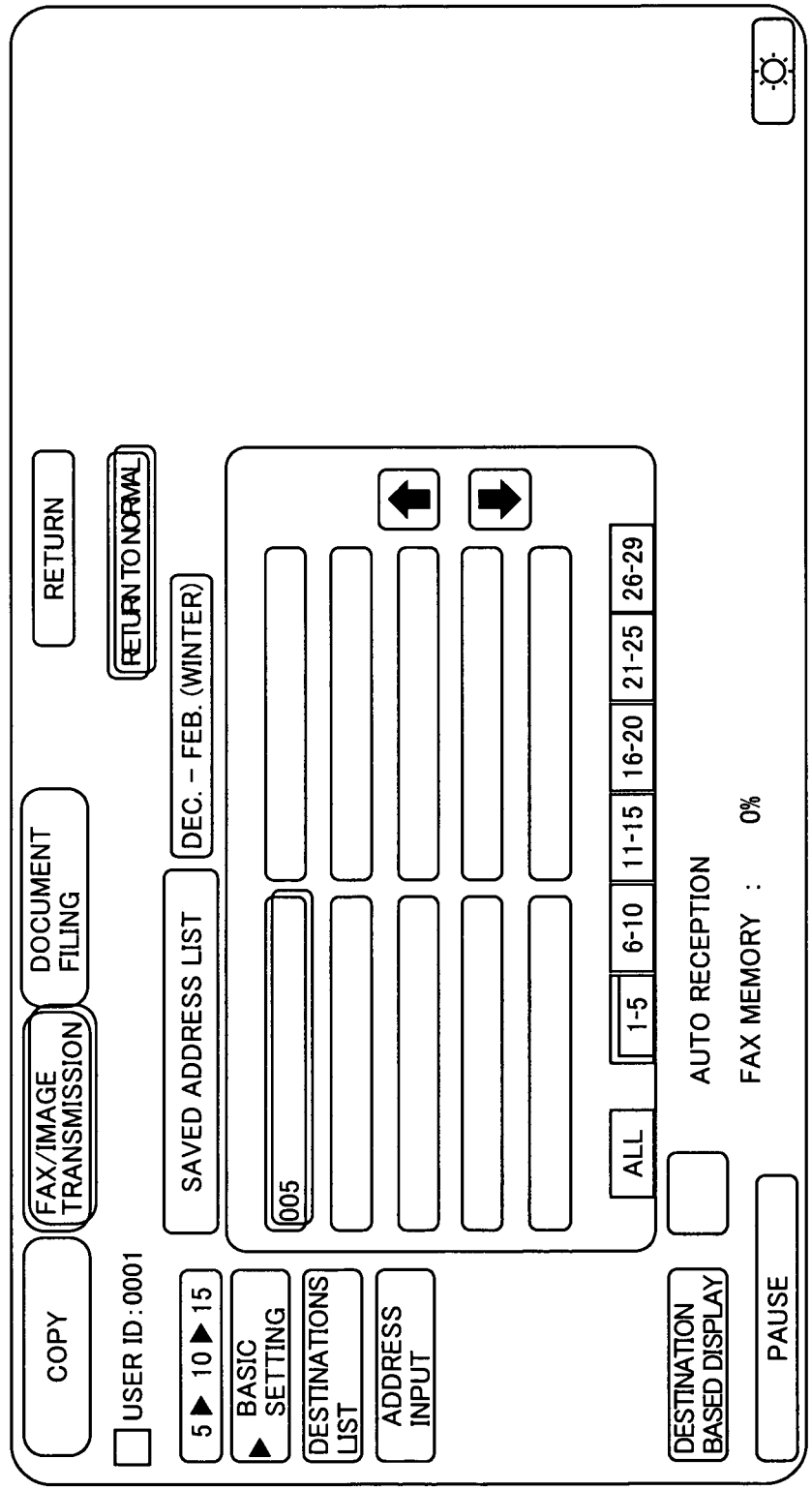

The fourth embodiment may be combined with the third embodiment. In that case, if the tab button "winter" shown in FIG. 27 is pressed, the display may be switched to the image shown in FIG. 28. In the example shown in FIG. 28, from the displayed addresses, the address or addresses can be further narrowed down based on the number of use. By way of example, addresses used frequently in "winter" may be displayed in accordance with the number of use in the save folder, as shown in FIG. 28. In this example, the displayed season is indicated on the right side of "return to normal" button. In this case, when the "return" key is pressed, the display may be returned to the image of FIG. 27. The combination of embodiments mentioned above is optional.

Referring to FIG. 28, assume that addresses in the save folder of the shared address book frequently used as destinations of fax/image transmission in "winter" that were used one to five times as the destinations of fax/image transmission are displayed on the save folder display image. If an address (for example, "005") to be restored from the save folder to the normal folder is pressed and the "return to normal" button is pressed as shown in FIG. 28, it is determined that the address "005" is designated as the address to be restored from the save folder to the normal folder, and the address is moved from the save folder to the normal folder.

As described above, according to this modification, the address list is displayed using a combination of a plurality of conditions. Therefore, it becomes easier for the logged-in user to find an address in the save folder.

It is noted that various dialogs and address display images of the appended figures are examples only. Dialogs and address display images different from these may be used.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image communication apparatus having a plurality of destinations registered in advance, and transmitting image data to an address designated from said plurality of destinations as a transmission destination, comprising:
   a storage device storing destination information used by said image communication apparatus to identify said destination, and frequency of use of said destination as a transmission destination;
   a destination display device displaying the plurality of destinations registered in advance in said storage device, giving higher priority to a destination having high frequency of use than a destination having low frequency;
   a designating device connected to said destination display device, allowing a user to designate a transmission destination from a plurality of destinations displayed by said destination display device;
   an image data transmitting device, connected to said designating device, for transmitting image data to a transmission destination designated by said designating device; and
   a display changing device connected to said storage device and said destination display device, for changing, if an address stored in said storage device and having low frequency of use and displayed without priority is designated as a transmission destination, a manner of display by said display device to display the address with priority, wherein:

said storage device includes a first area for storing information related to a destination having the high frequency and a second area for storing information related to a destination having the low frequency;

said destination display device includes a hierarchical display device displaying said plurality of destinations registered in advance in said storage device in a hierarchical manner, with a destination stored in said first area displayed on an upper layer than a destination stored in said second area;

said display changing device includes an area changing device for changing, if a destination stored in said second area and displayed on a lower layer is designated as a transmission destination, the destination to be stored in said first area;

said first area is a normal folder and said second area is a temporary save folder; and said area changing device includes an area moving device for moving a destination from said save folder to said normal folder.

2. The image communication apparatus according to claim 1, further comprising:

a folder designating device allowing a user to designate a destination to be moved between the folders; and a destination moving device for moving the destination designated by the user from said temporary save folder to said normal folder.

3. The image communication apparatus according to claim 1, wherein said display changing device further includes a display manner changing device for changing, when a destination having said low frequency is designated as a transmission destination, the manner of display of said destination based on restore conditions; and said restore conditions relate to the number of designations of said destination as said transmission destination.

4. The image communication apparatus according to claim 1, further comprising an authentication device for authenticating a user who logs-in; wherein said storage device stores said destination information and said frequency for each logged-in user;

said display changing device further includes a display manner changing device for changing, when a destination having said low frequency is designated as a transmission destination, the manner of display of said destination based on restore conditions; and said restore conditions relate to the number of designations by said logged-in user of said destination as said transmission destination.

5. The image communication apparatus according to claim 1, wherein said display changing device further includes a display manner changing device for changing, when a destination having said low frequency is designated as a transmission destination, the manner of display of said destination based on restore conditions; and said restore conditions relate to a user who designated said destination as said transmission destination.

6. The image communication apparatus according to claim 1, wherein said display changing device further includes a display manner changing device for changing, when a destination having said low frequency is designated as a transmission destination, the manner of display of said destination based on restore conditions; and said restore conditions relate to the number of designations of said destination as a transmission destination by a first user, and the number of designations of said destination as a transmission destination by a second user different from said first user.

7. The image communication apparatus according to claim 1, wherein said destination display device further includes a grouping device classifying and displaying destinations having said low frequency and displayed without priority in a plurality of groups.

8. The image communication apparatus according to claim 7, wherein said plurality of groups are set in accordance with a period in which a destination is not designated as a transmission destination.

9. The image communication apparatus according to claim 7, wherein said plurality of groups are set in accordance with the number of designations of a destination as a transmission destination.

10. The image communication apparatus according to claim 7, wherein said plurality of groups are set in accordance with a time when a destination is designated as a transmission destination.

11. The image communication apparatus according to claim 1, further comprising a deletion device deleting, from said storage device, a destination having said low frequency and displayed without priority by said display device, if a period in which the destination is not designated as a transmission address exceeds a predetermined period.

12. The image communication apparatus according to claim 11, further comprising a deletion authorization determining device for determining whether or not a logged-in user is authorized to delete a destination; wherein said deletion device includes a destination deletion device deleting, if it is determined by said deletion authorization determining device that the logged-in user is authorized to delete a destination, said destination from said storage device.

13. An image forming apparatus, comprising:

an image forming unit generating image data; and an image communication apparatus having a plurality of destinations registered in advance, and transmitting image data generated by said image forming unit to an address designated from said plurality of destinations as a transmission destination, wherein said image communication apparatus includes a storage device storing destination information for identifying said destination, and frequency of use of said destination as a transmission destination, a destination display device displaying the plurality of destinations registered in advance in said storage device, giving higher priority to a destination having high frequency of use than a destination having low frequency, a designating device connected to said destination display device, allowing a user to designate a transmission destination from a plurality of destinations displayed by said destination display device, an image data transmitting device, connected to said designating device, for transmitting image data to a transmission destination designated by said designating device, and a display changing device connected to said storage device and said destination display device, for changing, if an address stored in said storage device and having low frequency of use and displayed without priority is designated as a transmission destination, a manner of display by said display device to display the address with priority, wherein:

said storage device includes a first area for storing information related to a destination having the high frequency and a second area for storing information related to a destination having the low frequency;

said destination display device includes a hierarchical display device displaying said plurality of destinations registered in advance in said storage device in a hierarchical manner, with a destination stored in said first area displayed on an upper layer than a destination stored in said second area;

said display changing device includes an area changing device for changing, if a destination stored in said second area and displayed on a lower layer is designated as a transmission destination, the destination to be stored in said first area;

said first area is a normal folder and said second area is a temporary save folder; and said area changing device includes an area moving device for moving a destination from said save folder to said normal folder.

* * * * *